United States Patent
Ishii

(10) Patent No.: US 9,588,837 B2
(45) Date of Patent: Mar. 7, 2017

(54) GENERATING A FAULT TREE

(71) Applicant: International Business Machines Corporation, Armonk, NY (US)

(72) Inventor: Sugio Ishii, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 14/321,010

(22) Filed: Jul. 1, 2014

(65) Prior Publication Data
US 2015/0067400 A1 Mar. 5, 2015

(30) Foreign Application Priority Data

Sep. 3, 2013 (JP) .................................. 2013-181929

(51) Int. Cl.
G06F 11/00 (2006.01)
G06F 11/07 (2006.01)
G05B 23/02 (2006.01)

(52) U.S. Cl.
CPC ........ G06F 11/079 (2013.01); G06F 11/0706 (2013.01); G05B 23/0248 (2013.01); G05B 2219/24085 (2013.01)

(58) Field of Classification Search
CPC ............... G06F 11/0706; G06F 11/079; G05B 23/0248; G05B 2219/24085
See application file for complete search history.

(56) References Cited

U.S. PATENT DOCUMENTS

| | | | | |
|---|---|---|---|---|
| 7,200,525 B1 * | 4/2007 | Williams | .............. | G06F 11/008 702/185 |
| 2002/0138782 A1 * | 9/2002 | Durrant | ................ | G06F 11/079 714/2 |
| 2002/0166082 A1 * | 11/2002 | Ramadei | ............ | G05B 23/0248 714/37 |
| 2012/0330501 A1 * | 12/2012 | Sundaram | .......... | G05B 23/0248 701/33.9 |

(Continued)

FOREIGN PATENT DOCUMENTS

JP 05143570 A 6/1993
JP 05324761 A 12/1993

(Continued)

OTHER PUBLICATIONS

Younju Oh et al., Software safety analysis of function block diagrams using fault trees, Reliability Engineering and System Safety 88 (2005) 215-228, published Oct. 19, 2008.

(Continued)

*Primary Examiner* — Joshua P Lottich
(74) *Attorney, Agent, or Firm* — Scott S. Dobson

(57) ABSTRACT

A method, computer program product, and system that discards unneeded elements when generating a fault tree of an object to be analyzed. Configuration information identifies a plurality of functional blocks comprised by the object and a plurality of signal lines that connect the functional blocks in logical relationships. Exclusion target information identifies a signal line that may be excluded from the plurality of signal lines without loss of information or a functional block that may be excluded from the plurality of functional blocks without loss of information. Exclusion of a block or signal line may be determined by detecting a redundant functional block or by detecting a circular signal path traversed by two or more signal lines. The generated fault tree omits the excluded block or signal line and identifies the existence of a redundant block or of a circular signal path.

20 Claims, 19 Drawing Sheets

(56) References Cited

U.S. PATENT DOCUMENTS

| | | | | |
|---|---|---|---|---|
| 2013/0018692 A1* | 1/2013 | Guo | ............... | G06F 11/008 705/7.25 |
| 2013/0042167 A1* | 2/2013 | Xiang | ............... | G06Q 10/10 714/786 |
| 2014/0325280 A1* | 10/2014 | Xiang | ............... | G06F 11/0709 714/37 |
| 2015/0168271 A1* | 6/2015 | He | ............... | G05B 23/0248 702/183 |
| 2015/0193290 A1* | 7/2015 | He | ............... | G05B 23/0248 714/37 |

FOREIGN PATENT DOCUMENTS

| | | |
|---|---|---|
| JP | 06095881 A | 4/1994 |
| JP | 2009289020 A | 12/2009 |
| JP | 2010237855 A | 10/2010 |
| JP | 2011238031 | 11/2011 |
| JP | 2012113582 A | 6/2012 |

OTHER PUBLICATIONS

Papadopoulos, Yiannis & Maruhn, Matthias, Model-Based Synthesis of Fault Trees from Matlab-Simulink models, Dependable Systems and Networks International Conference, 2001, 0-7695-1101-5, Jul. 1, 2001, pp. 77-82.

Hirayama, Masayuki et al., Generating Test Items by Applying Software Fault Tree Analysis, Journal of Computer Science and Technology, V. 20, Iss. 2, Mar. 2005, 10.1007/s11390-005-0250-7, pp. 250-257.

Product Description: Diagram Construction / FaultTree+ in Reliability Workbench, http://www.isograph.com/software/reliability-workbench/fault-tree-analysis, copyright 1996-2011, 1 page.

Banach, Richard & Bozzano, Marco, Tutorial: The mechanical generation of fault trees for State Transition Systems, School of Computer Science I, Sep. 25, 2008, available at http://www.cs.man.ac.uk/~banach/retrenchment/SafetyTutorial/FaultTrees.TUTORIAL.PRINT.4up.pdf, 39 pp.

* cited by examiner

| FUNCTIONAL BLOCK NAME | FUNCTIONAL BLOCK ID | TYPE | SIGNAL NAME | SIGNAL ID | DESTINATION FUNCTIONAL BLOCK ID |
|---|---|---|---|---|---|
| SENSOR 1 | SNS-1 | SENSOR | SENSOR 1 VALUE | SIG-S1 | CTL-1 |
| SENSOR 2 | SNS-2 | SENSOR | SENSOR 2 VALUE | SIG-S2 | CTL-1 |
| STOP SWITCH | SW-1 | SWITCH | SWITCH ON STATE | SIG-S3 | CTL-2 |
| STOP SWITCH | SW-1 | SWITCH | SWITCH OFF STATE | SIG-S4 | CTL-2 |
| SENSOR INPUT DETERMINING SECTION | CTL-1 | MICRO-CONTROLLER | INPUT DETERMINATION RESULT | SIG-C1 | CTL-3,CTL-4 |
| SWITCH DETERMINING SECTION | CTL-2 | MICRO-CONTROLLER | STOP REQUEST | SIG-C2 | CTL-3 |
| MOTOR 1 OUTPUT CONTROL SECTION | CTL-3 | MICRO-CONTROLLER | MOTOR 1 ACTUATION | SIG-A1 | MTR-1 |
| MOTOR 2 OUTPUT CONTROL SECTION | CTL-4 | MICRO-CONTROLLER | MOTOR 2 ACTUATION | SIG-A2 | MTR-2 |
| MOTOR 1 | MTR-1 | MOTOR | | | |
| MOTOR 2 | MTR-2 | MOTOR | | | |

FIG. 4

GENERATING A FAULT TREE

TECHNICAL FIELD

The present invention relates to an apparatus and a method for efficiently generating a fault tree of an object or event to be analyzed

BACKGROUND

One way to identify a cause of an error condition or other undesired event is to create a fault tree that represents, as a graphical hierarchical diagram, logical relationships among events, conditions, or other functions that may give rise to the undesired event.

Such a fault tree may comprise a root node that identifies a top-level event or object to be analyzed. Branches of such a fault tree may comprise other nodes that each identify a function that may give rise to the undesired event, and may further are connected by "signal-line" logical relationships. These signal lines may in turn be connected to inputs or outputs of logical operators, such as AND, OR, or NOR gates.

By assuming a hierarchical structure in which the object to be analyzed is identified by a root node of the tree, a fault tree can identify sets or sequences of events that may result in an occurrence of the object.

A fault tree that analyzes a real-world object may be very complex. Some of this complexity may be due to redundant or unnecessary functional blocks or signal lines that could be eliminated without affecting the accuracy, precision, or utility of the fault tree.

BRIEF SUMMARY

A first embodiment of the present invention provides a method for generating a fault tree of an object to be analyzed, wherein the object to be analyzed comprises a plurality of functional blocks, the method comprising:

a processor of a computer system storing a configuration information of the object to be analyzed, wherein the configuration information identifies the plurality of functional blocks and further identifies a plurality of signal lines that each connect two or more blocks of the plurality of functional blocks;

the processor acquiring an exclusion target information that identifies a part to be excluded from the fault tree, wherein the part to be excluded comprises at least one of a first functional block of the plurality of functional blocks and a first signal line of the plurality of signal lines; and the processor creating from the configuration information and from the exclusion target information a fault tree of a part to be analyzed, wherein the creating comprises excluding the part to be excluded from the plurality of functional blocks and from the plurality of signal lines.

A second embodiment of the present invention provides a computer program product, comprising a computer-readable hardware storage device having a computer-readable program code stored therein, said program code configured to be executed by a processor of a computer system to implement a method for generating a fault tree of an object to be analyzed, wherein the object to be analyzed comprises a plurality of functional blocks, the method comprising:

the processor storing a configuration information of the object to be analyzed, wherein the configuration information identifies the plurality of functional blocks and further identifies a plurality of signal lines that each connect two or more blocks of the plurality of functional blocks;

the processor acquiring an exclusion target information that identifies a part to be excluded from the fault tree, wherein the part to be excluded comprises at least one of a first functional block of the plurality of functional blocks and a first signal line of the plurality of signal lines; and the processor creating from the configuration information and from the exclusion target information a fault tree of a part to be analyzed, wherein the creating comprises excluding the part to be excluded from the plurality of functional blocks and from the plurality of signal lines.

A third embodiment of the present invention provides a computer system comprising a processor, a memory coupled to said processor, and a computer-readable hardware storage device coupled to said processor, said storage device containing program code configured to be run by said processor via the memory to implement a method for generating a fault tree of an object to be analyzed, wherein the object to be analyzed comprises a plurality of functional blocks, the method comprising:

the processor storing a configuration information of the object to be analyzed, wherein the configuration information identifies the plurality of functional blocks and further identifies a plurality of signal lines that each connect two or more blocks of the plurality of functional blocks;

the processor acquiring an exclusion target information that identifies a part to be excluded from the fault tree, wherein the part to be excluded comprises at least one of a first functional block of the plurality of functional blocks and a first signal line of the plurality of signal lines; and the processor creating from the configuration information and from the exclusion target information a fault tree of a part to be analyzed, wherein the creating comprises excluding the part to be excluded from the plurality of functional blocks and from the plurality of signal lines.

BRIEF DESCRIPTION OF THE DRAWINGS

FIG. 4 illustrates an example of a dependency relationship table indicating information of a dependency relationship set between functional blocks of the functional block diagram according to the embodiment of the present invention;

FIG. 18-1 is a flowchart illustrating an operation example of a fault-tree generation section of the safety analysis assistance apparatus according to the present embodiment; and FIG. 18-2 is a flowchart illustrating an operation example of the fault-tree generation section of the safety analysis assistance apparatus according to the present embodiment.

DETAILED DESCRIPTION

Figure 1:
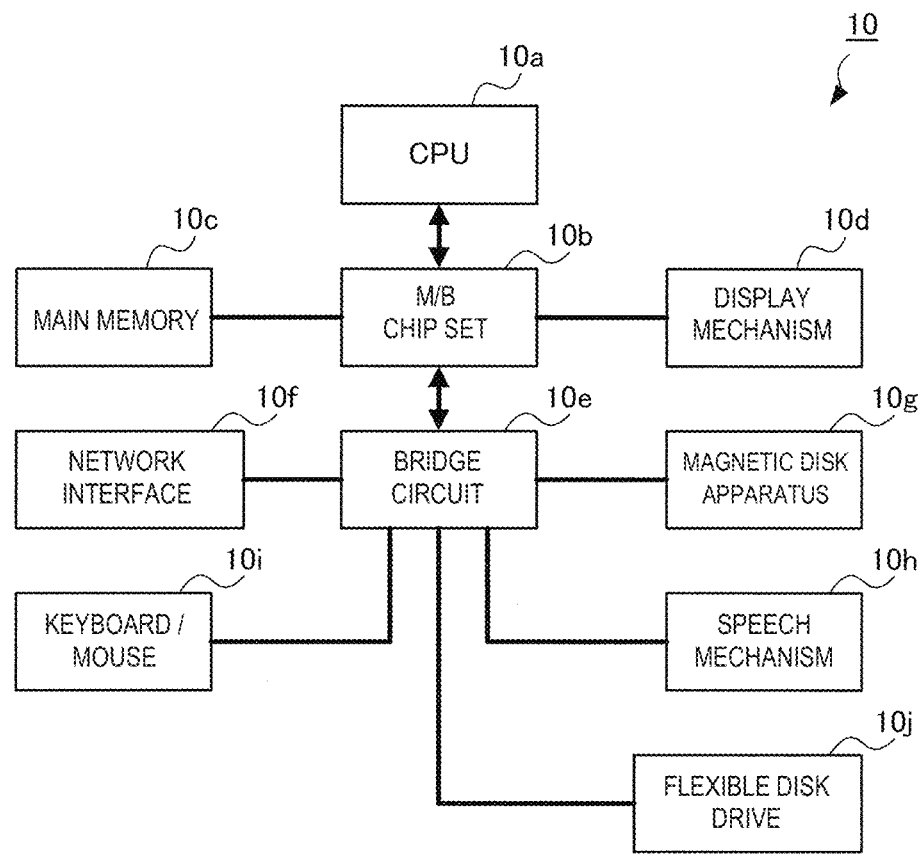
FIG. 1 illustrates a hardware configuration example of a safety analysis assistance apparatus according to an embodiment of the present invention.

Hereinafter, an embodiment of the present invention will be described in detail with reference to the accompanying drawings.

As will be described below, one way to analyze potential error conditions is to create a fault tree, which represents relationships among events or conditions as nodes into a hierarchical logic diagram. Such a fault tree may comprise a root node that identifies an event or object to be analyzed. Branches of the tree comprise functional-block nodes and "signal-line" logical relationships among functional blocks that may result in an occurrence of the event or object to be analyzed.

For example, if a "data loss" event or condition may occur if and only if: i) a disk drive fails; and ii) a backup disk is unreadable, a fault tree that analyzes the event or object "data loss" would comprise a logic diagram in which an AND gate is connected via signal lines to input functional blocks "disk drive fails" and "backup disk is unreadable" and connected via another signal line to output functional block "data loss." If this fault tree is viewed as a hierarchical structure, the event or object to be analyzed would be the root of the fault tree and the AND gate inputs might be considered to be leaves of the fault tree.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Within this context, the present invention provides an apparatus, method, system, and program product for generating a fault tree of an object to be analyzed from configuration information that indicates a configuration of the object to be analyzed, including a storage section configured to store configuration information that indicates a plurality of functional blocks constituting an object to be analyzed and a plurality of signal lines between the plurality of functional blocks, an acquiring section configured to acquire exclusion target information indicating a part to be excluded, the part including at least one of a functional block to be excluded out of the plurality of functional blocks and a signal line to be excluded out of the plurality of signal lines, and a fault-tree generation section configured to generate from the configuration information and the exclusion target information the fault tree involving a part to be analyzed obtained by excluding the part to be excluded from the plurality of functional blocks and the plurality of signal lines.

Here, this apparatus, method, system, or program product may further include an accepting section configured to accept a top event of the fault tree and the acquiring section may acquire the exclusion target information indicating the part to be excluded, the part including at least one of a functional block for performing operation not affecting the top event from the plurality of functional blocks and a signal line for propagating a signal not affecting the top event from the plurality of signal lines.

The acquiring section may acquire the exclusion target information indicating the part to be excluded including a functional block provided for safety from the plurality of functional blocks.

When there are, included in the plurality of functional blocks, a first functional block, a second functional block and a third functional block, with a signal line for propagating a signal to the third functional block being connected to the first functional block and a signal line for propagating a signal from the third functional block being connected to the second functional block, the acquiring section may further acquire the exclusion target information indicating the part to be excluded including the third functional block.

The apparatus, method, system, or program product may further include a functional block diagram-generation section configured to generate a functional block diagram representing the plurality of functional blocks and the plurality of signal lines in graphics from the configuration information and an adding section configured to add to the functional block diagram from the exclusion target information an index to distinguish the part to be analyzed from the part to be excluded.

According to the present invention, when generating a fault tree of an object to be analyzed from a plurality of functional blocks constituting an object to be analyzed and a plurality of signal lines between the plurality of functional blocks, it is possible to prevent expansion of a fault tree.

Fault analyses of electronic devices and other functional systems are indispensable for ensuring compliance with safety and quality standards. One fault-analysis technique is a fault tree analysis (FTA), which identifies ways in which a fault or error condition may be caused by a combination of a fault mode of a lower-level item and an external event. FTA is a top-down analysis technique that hierarchically organizes, with an "undesired event (fault, accident or the like)" as a starting point (top), faults that can be factors responsible therefor to form a fault tree and examines the possibility of an addition of a safety mechanism so that a single fault may not cause the "undesired event" at the top.

More specifically, a fault tree is formed by hierarchically connecting nodes representing faults that are factors (hereinafter referred to as "factor nodes") successively, starting from the "undesired event" at the top (hereinafter referred to as the "FTA top event"), with a condition under which a higher-level event occurs if any single event occurs (OR condition), or a condition under which it occurs only if a plurality of events a plurality of lower-level events occur simultaneously (AND condition).

Creating a fault tree requires experiences and expertise with which it is possible to exhaustively extract and analyze all lower-level faults which become factors responsible for a certain fault (failure or malfunction). Thus, there may possibly be omission and it is difficult to indicate or verify the comprehensiveness. Moreover, in order to meet the ISO26262 standard, when an electronic device has a plurality of output sections (actuators) and the safety level required for each output section differs from one another, it is necessary to identify a control section (microcontroller, controller) and an input section (sensor, switch) associated with each output section, define a dependency relationship and then examine whether or not a safety mechanism is required. Furthermore, a review or makeover of a fault tree needs to be done every time an arrangement of a functional block or part of an electronic device is changed due to trial and error in an upstream system design stage or a design change in an advanced stage or the like.

For these reasons, a fault tree may be automatically generated from a functional block diagram using a computer program.

However, in a concept-level functional block diagram (initial architecture conceptual diagram or the like required in ISO26262), the functional granularity of functional blocks is large, relationships between input, processing logic and output is unclear, and the design generally starts in a condition in which many inputs/outputs are assigned to one functional block and gradually becomes more detailed. For this reason, when a fault tree is mechanically created from the functional block diagram (or equivalent dependency relationship table), even events not affecting the top event may be mixed into the fault tree, which may result in a problem that the number of nodes to be analyzed on the fault tree increases and the work of narrowing down fault factors (work of excluding factors that do not occur) increases.

Moreover, in the concept-level functional block diagram, since a detailed design of functional blocks is not performed, circulation of a dependency relationship extending over a plurality of functional blocks may occur. When circulation of the dependency relationship is detected through mechanical generation of a fault tree, the functional block may be divided in accordance with the cause of circulation or logical processing within the functional block may be modified or re-generated, resulting in a problem of taking time and trouble. Furthermore, since a functional block diagram is changed, if there is a fault tree generated for another FTA top event, it is necessary to re-generate and re-analyze a fault tree in the changed functional block diagram.

Furthermore, the safety analysis recommended in ISO26262 requires an analysis excluding a safety mechanism. Normally, when a concept-level functional block diagram is created based on past experiences, a drawn functional block diagram includes admixed mechanisms such as fault diagnosis and confirmation (feedback) of an output signal. When a fault tree is generated from this functional block diagram as an exclusive function of a dependency relationship of simple functional blocks, a fault tree, including a safety mechanism, is created, resulting in a problem of taking time and trouble to exclude factor nodes associated with the safety mechanism. In particular, since one safety mechanism appears at a plurality of locations in the fault tree, the greater and more complicated the functional block diagram is, the more safety mechanisms appear.

Furthermore, when mechanically generating a fault tree from the functional block diagram, a reviewer needs to review reasons for excluding a lower-level fault which does not become a factor for a higher-level fault on the fault tree. In this case, depending on the dependency relationship, one functional block may repeatedly appear on the fault tree and the same reasons for exclusion may be frequently described, resulting in a problem of time-consuming review. Another problem is that it is difficult to identify the part of the functional block diagram from which the appropriateness of the reasons for exclusion is determined.

Thus, the present embodiment provides a safety analysis assistance apparatus that solves these problems and thereby makes more efficient operation of repeatedly generating and analyzing a fault tree from a concept-level (higher level) functional block diagram, reflecting the analysis result in a functional block diagram and re-generating a fault tree, and eventually completing a fault tree in which fault factors are narrowed down to functional blocks that affect an FTA top event. Furthermore, this safety analysis assistance apparatus also facilitates a review by a reviewer by reviewing the reasons for narrowing down stored as the work result in addition to the functional block diagram and the fault tree.

FIG. 1 illustrates a hardware configuration example of a safety analysis assistance apparatus 10 according to the present embodiment. As shown in the drawing, the safety analysis assistance apparatus 10 is provided with a CPU (central processing unit) 10a which is computing means, a main memory 10c connected to the CPU 10a via an M/B (motherboard) chip set 10b, and a display mechanism 10d likewise connected to the CPU 10a via the M/B chip set 10b. Furthermore, a network interface 10f, a magnetic disk apparatus (HDD) 10g, a speech mechanism 10h, a keyboard/mouse 10i, and a flexible disk drive 10j are connected to the M/B chip set 10b via a bridge circuit 10e.

In FIG. 1, each component is connected via a bus. For example, the CPU 10a and the M/B chip set 10b, and the M/B chip set 10b and the main memory 10c are connected via a CPU bus. The M/B chip set 10b and the display mechanism 10d may be connected together via an AGP (accelerated graphics port), but when the display mechanism 10d includes a PCI Express compatible video card, the M/B chip set 10b and this video card are connected together via a PCI Express (PCIe) bus. When connecting the network interface 10f to the bridge circuit 10e, for example, PCI Express can be used. For the magnetic disk apparatus 10g, for example, serial ATA (AT attachment), parallel transfer ATA or PCI (peripheral components interconnect) can be used. Furthermore, for the keyboard/mouse 10i and flexible disk drive 10j, USB (universal serial bus) can be used.

Figure 2:
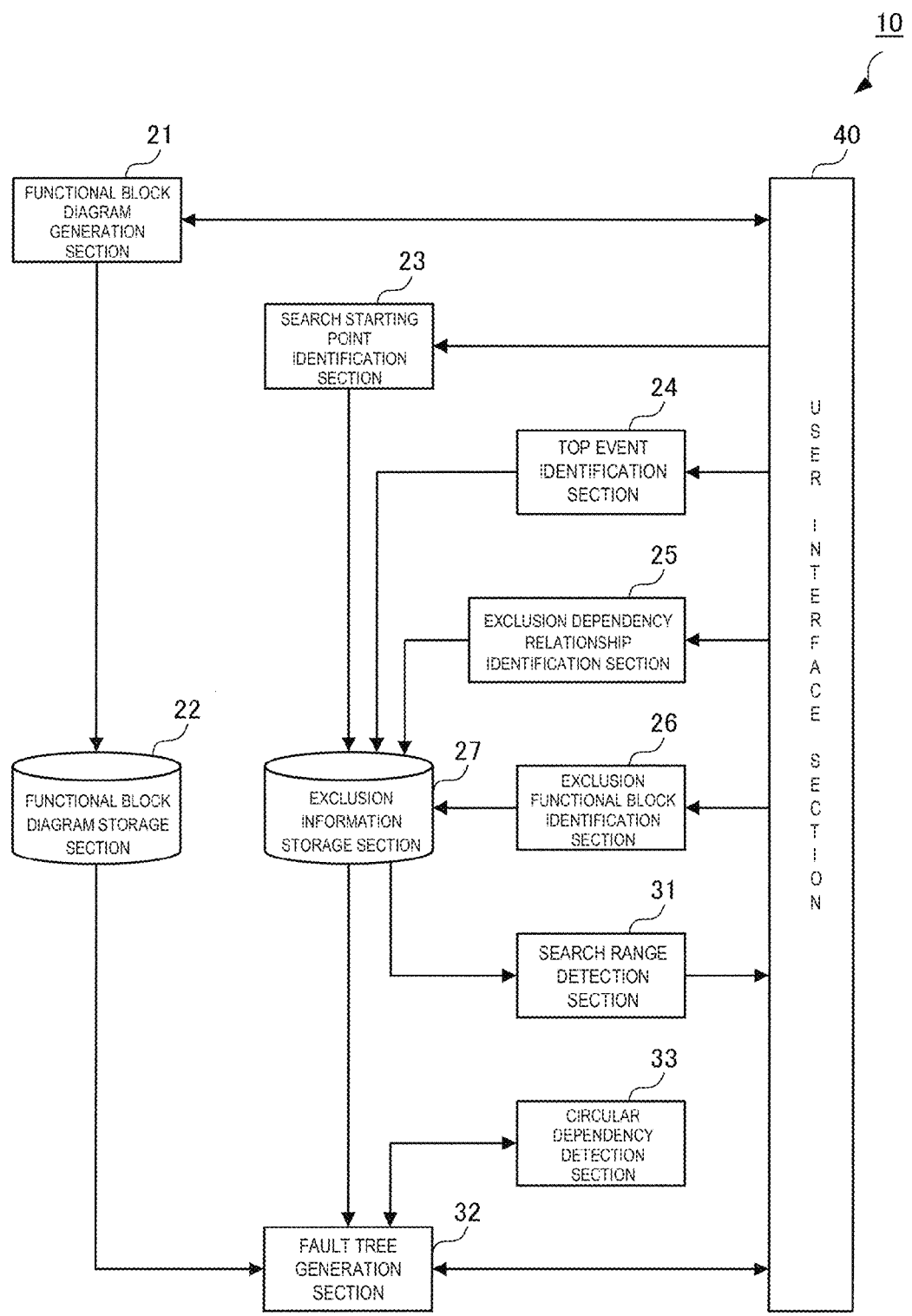
FIG. 2 is a block diagram illustrating a functional configuration example of the safety analysis assistance apparatus according to the embodiment of the present invention.

FIG. 2 is a block diagram illustrating a functional configuration example of the safety analysis assistance apparatus 10 according to the present embodiment. As illustrated in the drawing, the safety analysis assistance apparatus 10 is provided with a functional block diagram generation section 21, a functional block diagram storage section 22, a search starting point identification section 23, a top event identification section 24, an exclusion dependency relationship identification section 25, an exclusion functional block identification section 26, and an exclusion information storage section 27. The safety analysis assistance apparatus 10 is also provided with a search-range detection section 31, a fault-tree generation section 32 and a circular dependency detection section 33. The safety analysis assistance apparatus 10 is further provided with a user interface section 40.

When a designer creates a functional block diagram on the display mechanism 10d (see FIG. 1) to design an electronic device or the like, the functional block diagram generation section 21 generates information on the functional block diagram.

Figure 3:
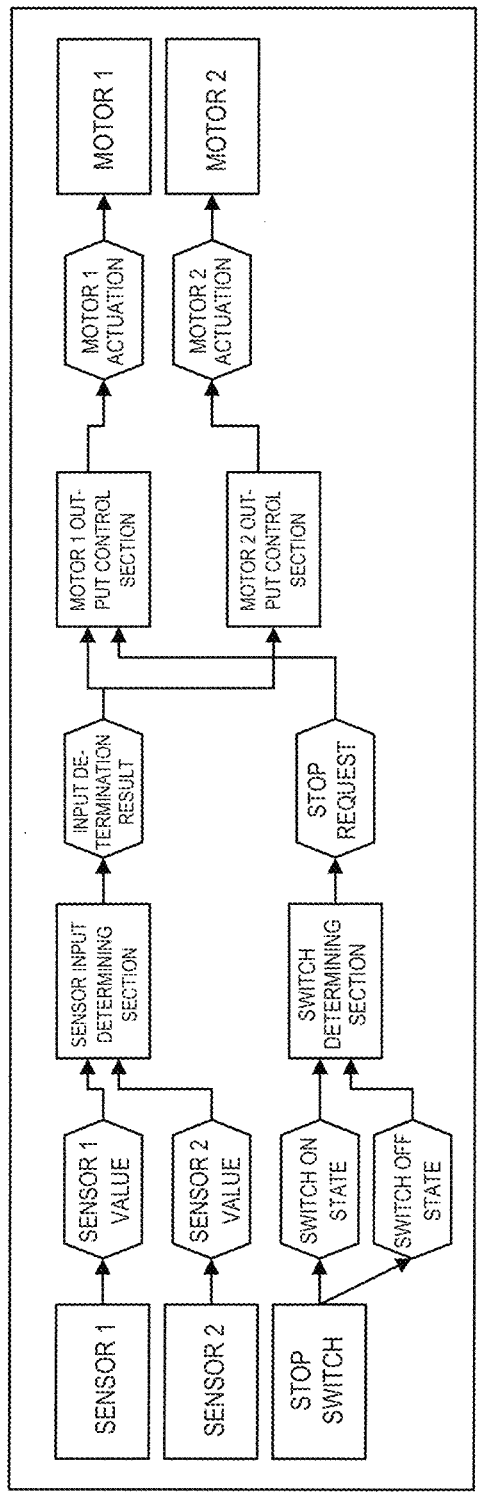
FIG. 3 illustrates an example of a functional block diagram created by a designer on a screen according to the embodiment of the present invention.

FIG. 3 shows an example of the functional block diagram created by the designer in this case. This functional block diagram relates to a mechanism in which "motor 1" and "motor 2" are actuated by signals from "sensor 1" and "sensor 2" and "motor 1" is stopped by a signal from "stop switch."

The functional block diagram storage section 22 stores information about the functional block diagram generated by the functional block diagram generation section 21. Here, as the information on the functional block diagram, information (corresponding to a signal and a communication message or the like) on a dependency relationship set between functional blocks is stored.

FIG. 4 shows an example of a dependency relationship table that represents characteristics of such a dependency relationship as a table. This dependency relationship table shows, for example, that a destination functional block ID of "sensor 1" is "CTL-1," the functional block having this functional block ID is "sensor input determining section," the destination functional block IDs thereof are "CTL-3" and "CTL-4," the functional blocks having these functional block IDs are "motor 1 output control section" and "motor 2 output control section," the destination functional block IDs thereof are "MTR-1" and "MTR-2," and the functional blocks having these functional block IDs are "motor 1" and "motor 2." In the present embodiment, information on the functional block diagram is used as an example of configuration information indicating a configuration of an object to be analyzed and the functional block diagram storage section 22 is provided as an example of the storage section that stores the configuration information.

When the designer performs an operation of selecting a final stage functional block that acts on an external device such as an electronic device as a starting point of dependency relationship search processing when generating a fault tree using the keyboard/mouse 10i (see FIG. 1) or the like on the functional block diagram, the search starting point identification section 23 identifies a functional block that becomes a starting point of this dependency relationship search processing (hereinafter referred to as "search starting point functional block").

When analyzing more than one FTA top event using the same functional block diagram, if the designer selects an FTA top event to be specified for exclusion, the top event identification section 24 identifies this FTA top event. For example, when designing a safety mechanism corresponding to an FTA top event that an "airbag does not deploy when collision occurs" in an airbag system of a vehicle or an FTA top event that an "airbag deploys when no collision occurs," there is a difference between a functional block associated with generation of a deployment instruction signal and a functional block associated with generation of a deployment prohibition signal, and there are a functional block used commonly for the two FTA top events and a functional block that gets involved in only one of the two FTA top events, and therefore one FTA top event is selected in this way. In the present embodiment, the top event identification section 24 is provided as an example of an accepting section that accepts a top event of the fault tree.

Figure 5:
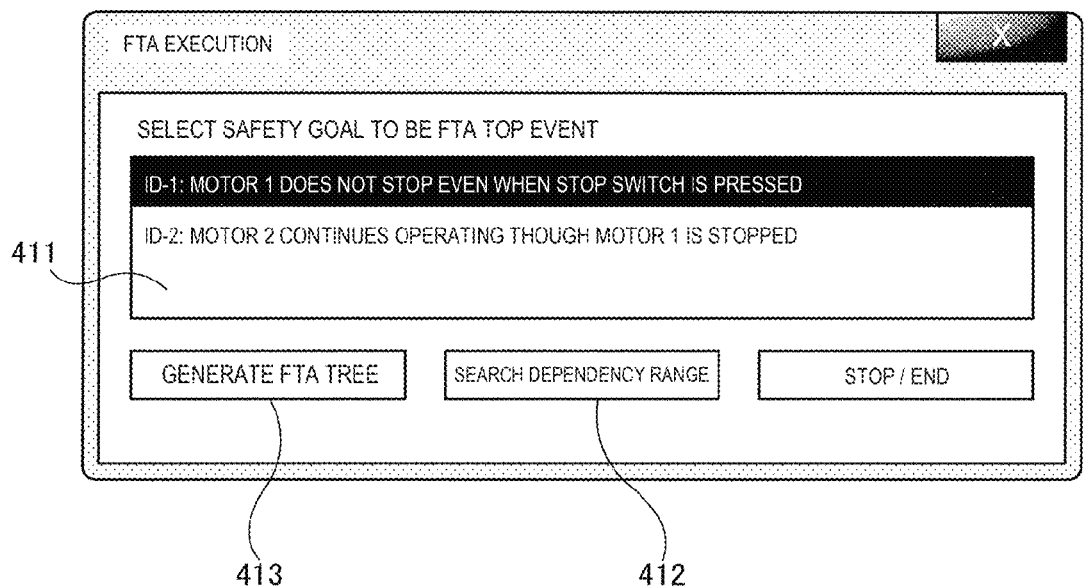
FIG. 5 illustrates an example of an FTA execution panel operated by the designer to select an FTA top event to be specified for exclusion according to the embodiment of the present invention.

FIG. 5 shows an example of an FTA execution panel operated by the designer to select an FTA top event to be specified for exclusion. In this FTA execution panel, either "motor 1 does not stop even when stop switch is pressed" or "motor 2 continues operating although motor 1 is stopped" is selectable as an FTA top event in a list box 411.

When the designer specifies a dependency relationship to be excluded through dependency relationship search processing for each functional block when generating a fault tree and performs operation of inputting reasons therefor, the exclusion dependency relationship identification section 25 identifies this dependency relationship as a dependency relationship to be excluded. An example of the dependency relationship that does not affect the FTA top event is a motor stop signal to perform controls to keep normal safety state in the abnormal event. This is because, for example, when the FTA top event is "fuel injection continues in event of collision of vehicle," a motor stop signal for manually stopping the motor to stop fuel injection only has a function of stopping the motor, and it does not get involved in violation of the FTA top event. Therefore, excluding a search for a functional block associated with the generation of this motor stop signal is effective in reducing the size of the fault tree. In the design of a concept-level functional block diagram, since detailed internal logic (functional breakdown, functional stratification, arithmetic processing specification of an output value corresponding to an input value) is usually not considered, the present embodiment provides means for considering the presence or absence of influences on the FTA top event before refinement of the internal logic, and excluding the influences for each input of functional blocks (hardware signal and software message). As an example of the acquiring section configured to acquire exclusion target information indicating a part to be excluded, the present embodiment provides the exclusion dependency relationship identification section 25.

Figure 6:
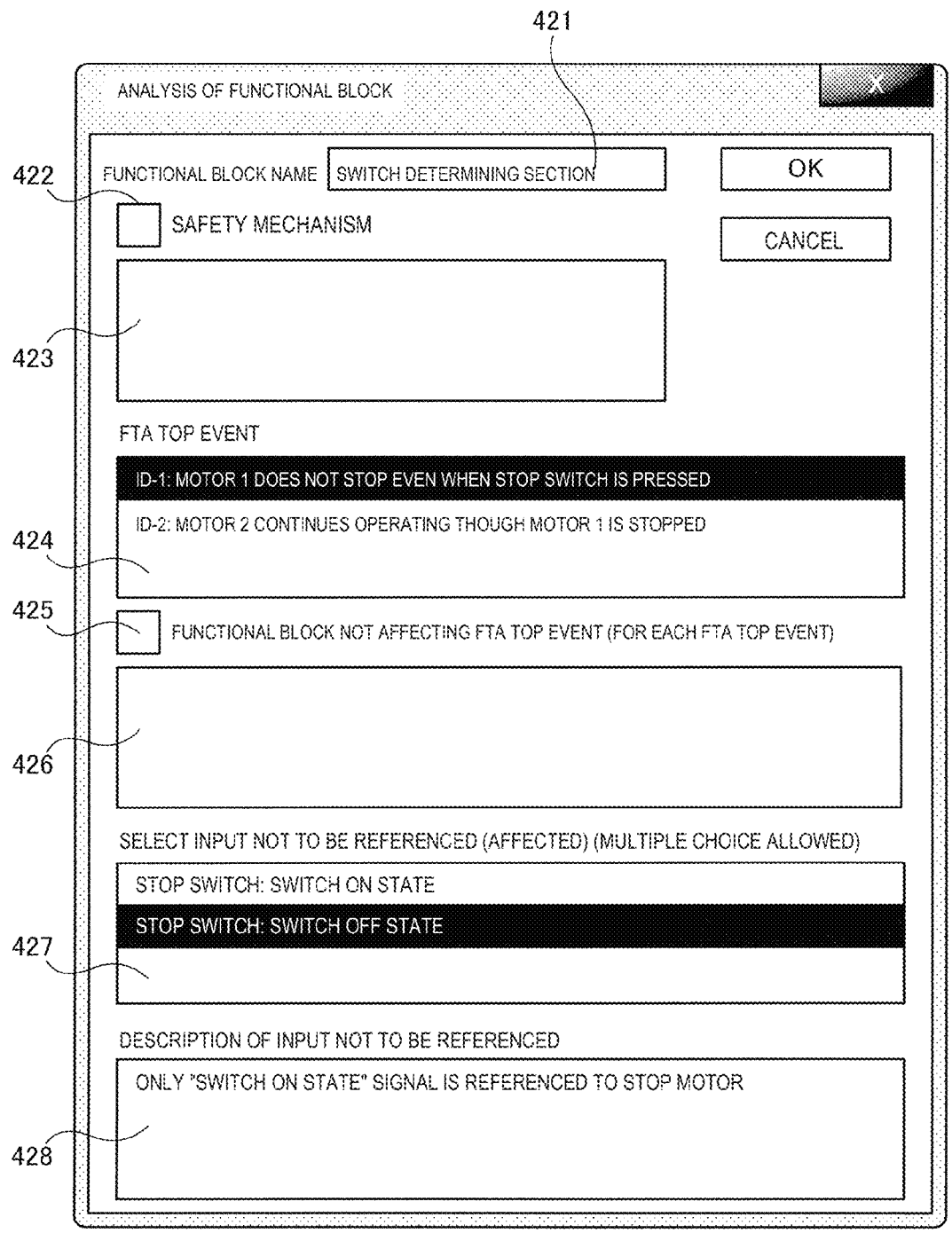
FIG. 6 illustrates an example of a functional block-analysis panel operated by the designer to specify a dependency relationship to be excluded according to the embodiment of the present invention.

FIG. 6 shows an example of a functional block-analysis panel operated by the designer to specify a dependency relationship to be excluded. In this functional block-analysis panel, for the "switch determining section" displayed in a display field 421, "switch OFF state" is specified to be excluded in a list box 427 as a dependency relationship (input) that does not affect "motor 1 does not stop even when stop switch is pressed" selected in a list box 424. In the functional block-analysis panel, when the FTA top event is switched in the list box 424, contents of the list box 427 and a text box 428 are also switched.

When the designer specifies the functional block to be excluded in the dependency relationship search processing when generating a fault tree and performs operation of inputting reasons therefor, the exclusion functional block identification section 26 identifies this functional block as a functional block to be excluded. The functional block to be excluded may be specified, for example, by specifying a functional block irrespective of the FTA top event as the safety mechanism or specifying a functional block in accordance with the FTA top event. The former in particular is a typical example of excluding the functional block itself from an FTA object. Therefore, when FTA is executed based on a functional block diagram, the safety mechanism needs to be identified. For example, a case will be considered where a fault tree is generated without identifying a duplexed sensor input or a watchdog function for monitoring a certain functional block as the safety mechanism. In this case, the respective factors hang from a higher-level factor node under OR conditions, resulting in an excessive design where a further safety mechanism is considered for the existing safety mechanism, leading to an enlarged fault tree. An FTA using a hardware circuit block diagram and a software functional block diagram with a detailed functional specification is primarily aimed at exhaustively extracting factors through analyses of causes of faults or malfunctions. On the other hand, the present embodiment provides means for generating a fault tree to design a safety mechanism by excluding a part of the functional block diagram as the safety mechanism. The present embodiment provides the exclusion functional block identification section 26 as an example of the acquiring section configured to acquire exclusion target information indicating a part to be excluded.

Figure 7:
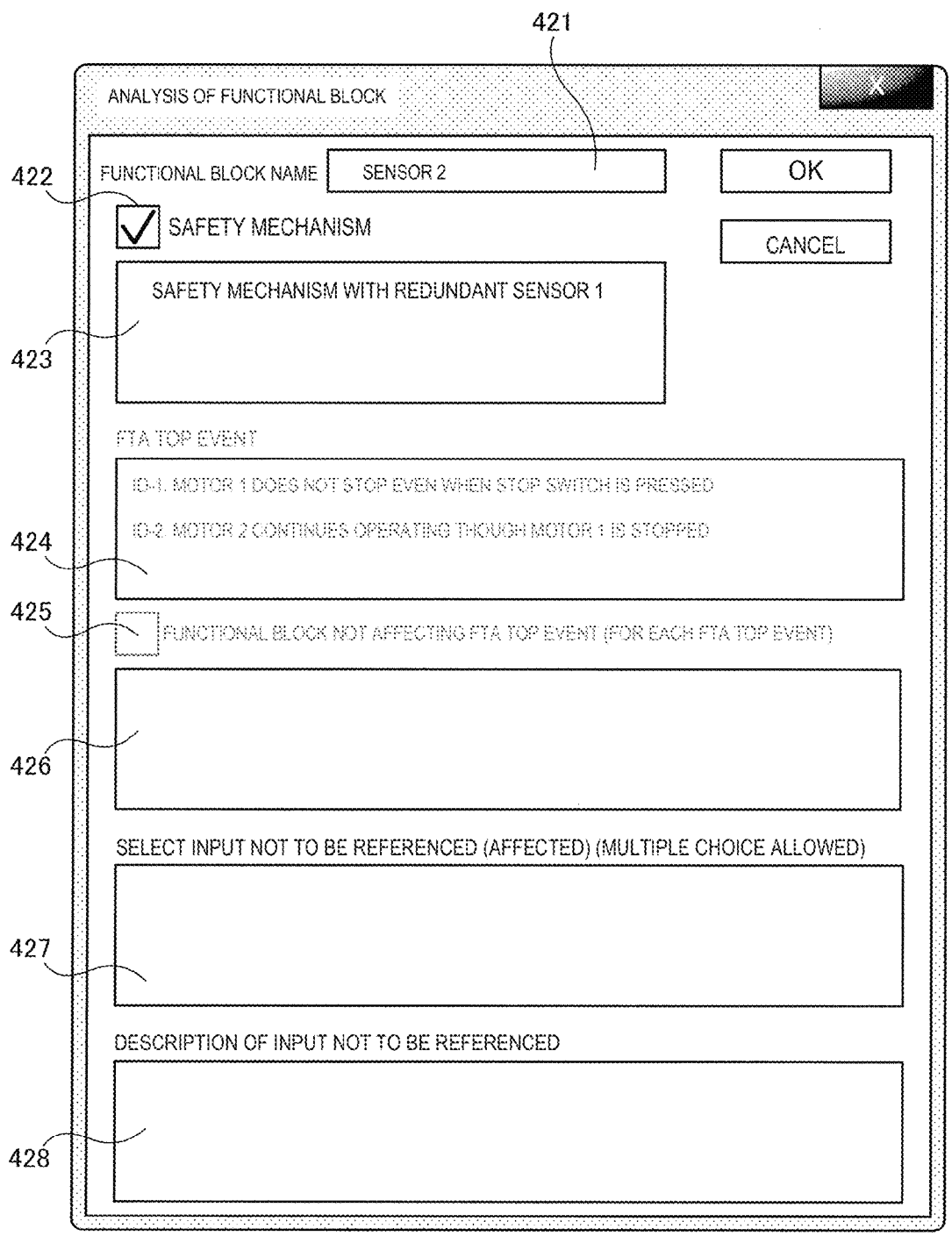
FIG. 7 illustrates an example of a functional block-analysis panel operated by the designer to specify a functional block to be excluded according to the embodiment of the present invention.
Figure 8:
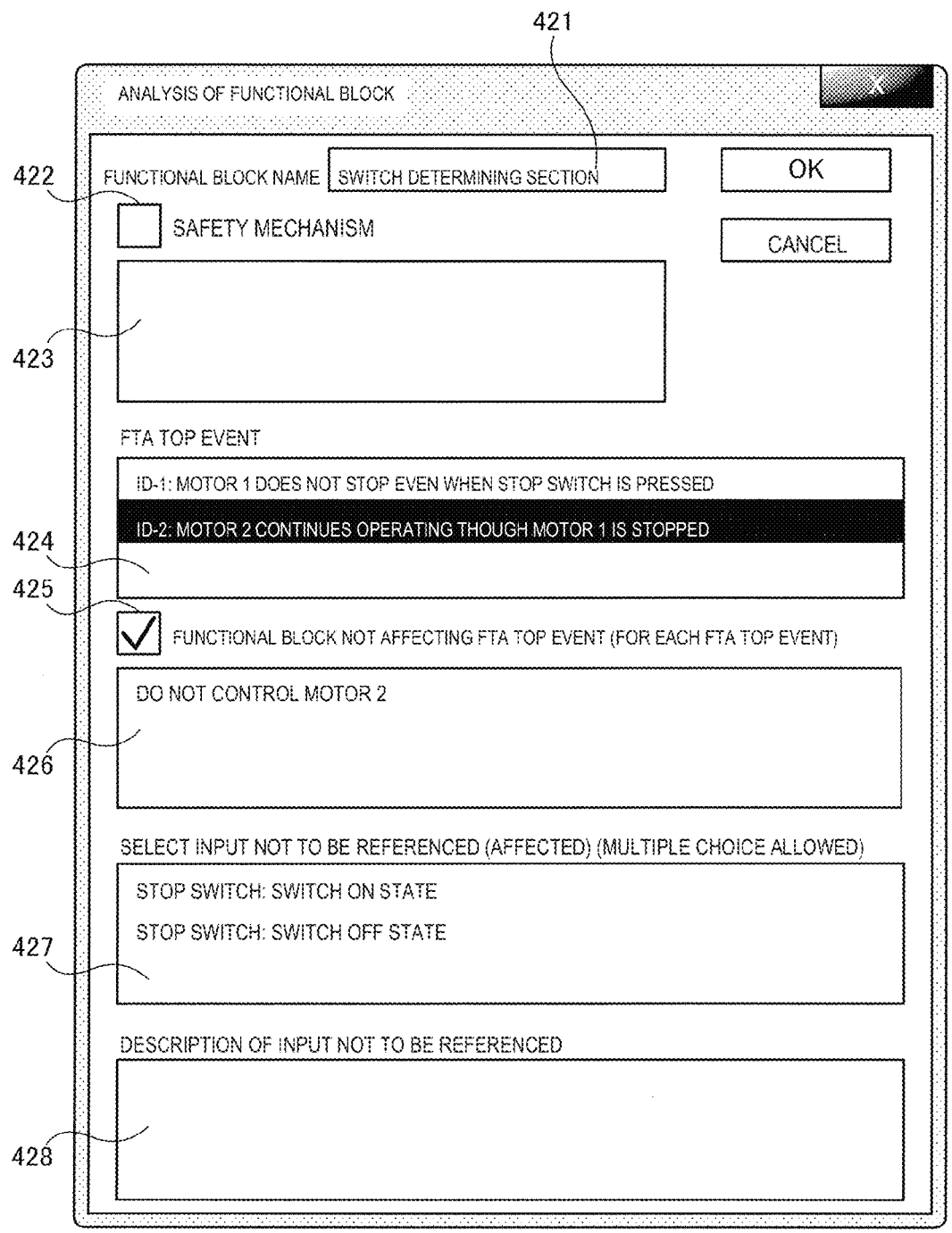
FIG. 8 illustrates an example of a functional block-analysis panel operated by the designer to specify a functional block to be excluded according to the embodiment of the present invention.

FIG. 7 and FIG. 8 show examples of the functional block-analysis panel operated by the designer to specify a functional block to be excluded. In the functional block-analysis panel in FIG. 7, "sensor 2" displayed in the display field 421 is specified to be excluded as the safety mechanism with a check box 422 being checked. Note that since the safety mechanism is specified irrespective of the FTA top event and that, when the check box 422 is checked in the functional block-analysis panel in FIG. 7, the inside of the list box 424 is grayed out. In the functional block-analysis panel in FIG. 8, "switch determining section" displayed in the display field 421 is specified to be excluded as a functional block that does not affect "motor 2 continues operating although motor 1 is stopped" selected in the list box 424 with a check box 425 being checked. In the functional block-analysis panel in FIG. 8, when the FTA top event in the list box 424 is switched, contents of the list box 427 and the text box 428 are also switched.

The exclusion information storage section 27 (of FIG. 2) stores exclusion information including information on a search starting point functional block identified by the search starting point identification section 23, information on an FTA top event identified by the top event identification section 24, information on an exclusion dependency relationship identified by the exclusion dependency relationship identification section 25 and information on a functional block to be excluded identified by the exclusion functional block identification section 26.

The search-range detection section 31 detects a range to be searched through the dependency relationship search processing based on exclusion information stored in the exclusion information storage section 27. More specifically, when a dependency relationship (input signal, input message) for each functional block specified to be excluded is identified by the exclusion dependency relationship identification section 25 and the functional block specified to be excluded (functional block specified to be excluded irrespective of the FTA top event as the safety mechanism or functional block specified to be excluded in accordance with the FTA top event) is identified by the exclusion functional block identification section 26, the search-range detection section 31 detects the search range of the FTA according to these exclusion specifications.

Figure 9:
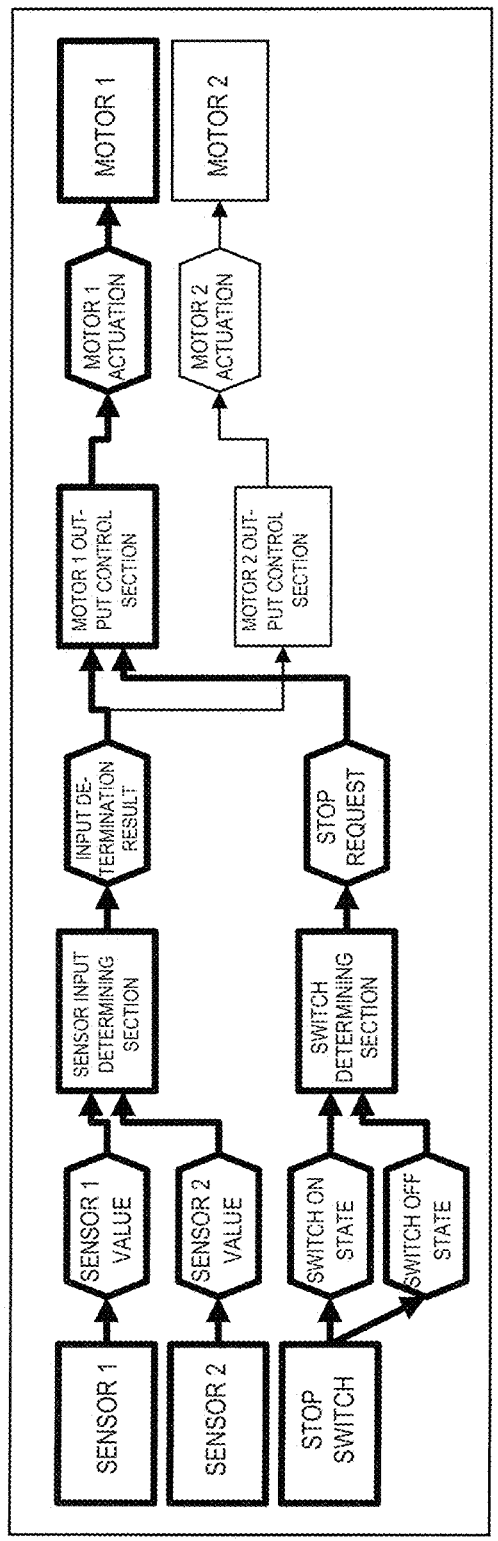
FIG. 9 illustrates an example of a functional block diagram reflecting a detection result within a search range according to the embodiment of the present invention.
Figure 10:
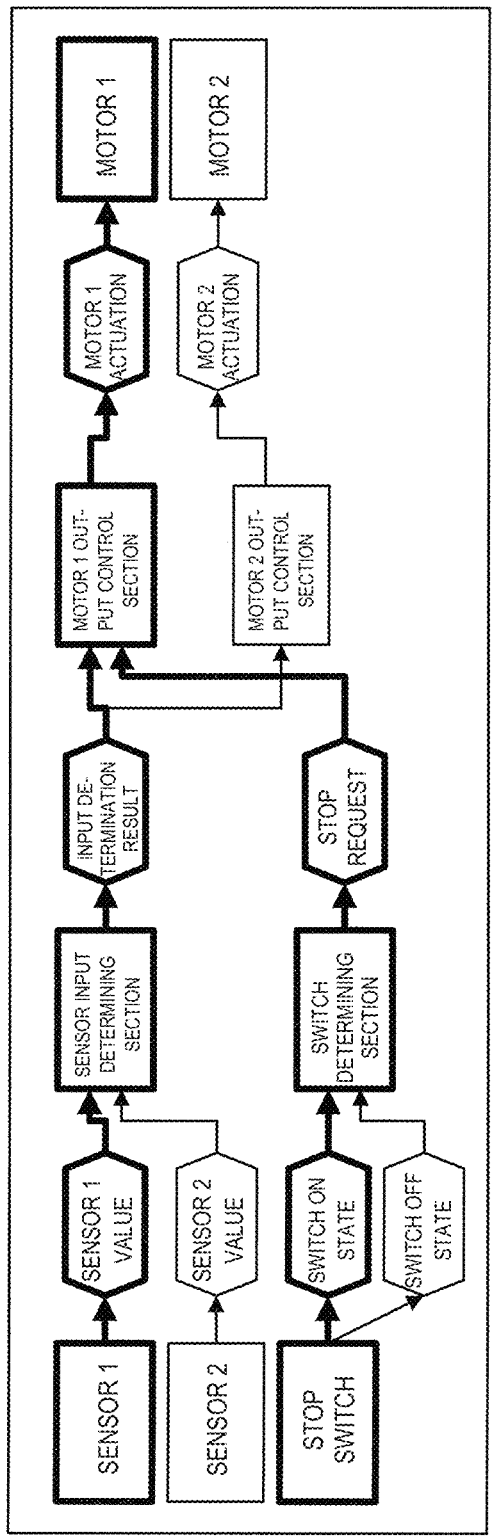
FIG. 10 illustrates another example of the functional block diagram reflecting a detection result within a search range according to the embodiment of the present invention.

FIG. 9 and FIG. 10 show examples of a functional block diagram reflecting a search-range detection result. FIG. 9 shows an example of the functional block diagram when the functional block and dependency relationship are not specified to be excluded, and all sensors and signals thereof, and a stop switch and a signal thereof are search targets. On the other hand, FIG. 10 shows an example of the functional block diagram when the functional block and dependency relationship are specified to be excluded, and "sensor 2" and "sensor 2 value" signal thereof, and "stop switch" and "switch OFF state" signal thereof are excluded from search targets.

The fault-tree generation section 32 generates a fault tree from information on the functional block diagram stored in the functional block diagram storage section 22 and exclusion information stored in the exclusion information storage section 27. More specifically, the fault-tree generation section 32 generates a fault tree using the search starting point functional block identified by the search starting point identification section 23 as a starting point for each FTA top event identified by the top event identification section 24 from a dependency relationship between functional blocks, the excluded parts identified by the exclusion dependency relationship identification section 25 and the exclusion functional block identification section 26. In that case, dependency relationship search processing is performed by excluding the dependency relationship and functional block specified to be excluded from the search targets.

Figure 11:
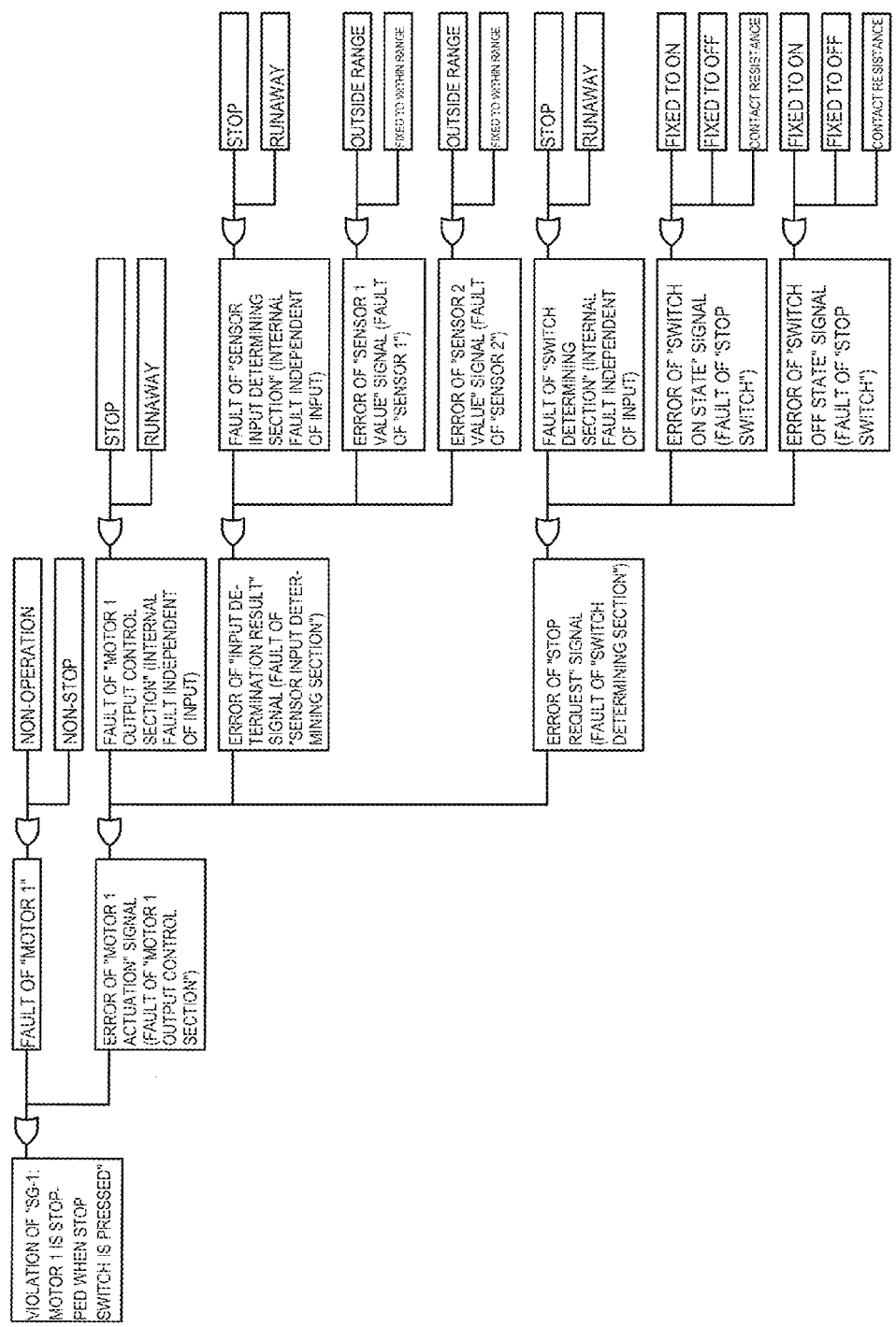
FIG. 11 illustrates an example of a fault tree generated according to the embodiment of the present invention.
Figure 12:
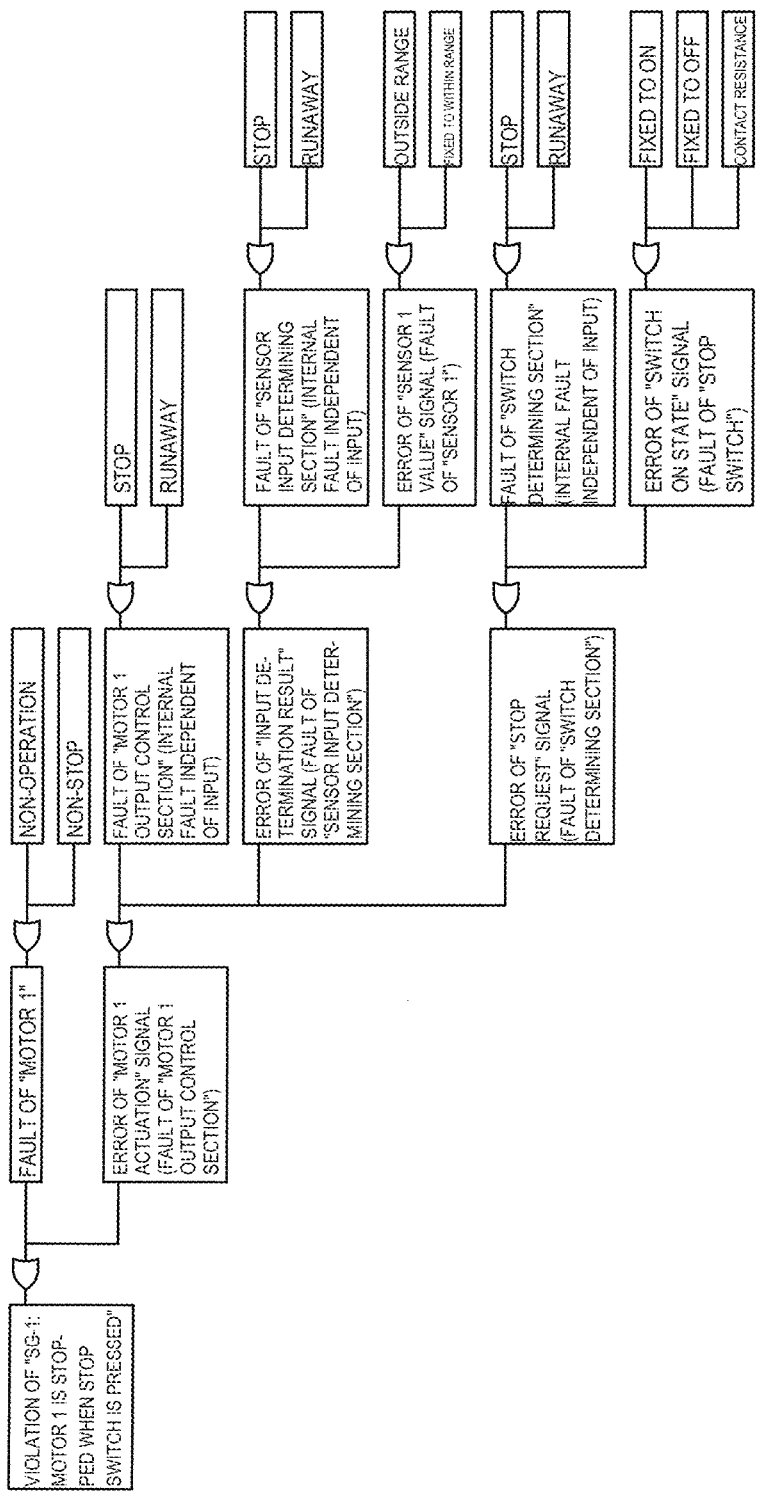
FIG. 12 illustrates another example of the fault tree generated according to the embodiment of the present invention.

FIG. 11 and FIG. 12 show examples of the fault tree generated by the fault-tree generation section 32. FIG. 11 shows an example of a fault tree when functional blocks and a dependency relationship are not specified to be excluded, and the number of factor nodes is 29. On the other hand, FIG. 12 shows an example of a fault tree when "sensor 2" is specified to be excluded as exclusion specification of a functional block and "switch OFF state" is specified to be excluded as exclusion specification of a dependency relationship, and the number of factor nodes is 22. That is, in FIG. 12, the factor node relating to the "error of "sensor 2 value" signal" is removed from the lower-level factor node of "error of "input determination result" signal," and the factor node relating to the "error of "switch OFF state" signal" is removed from the lower-level factor node of the "error of "stop request" signal." Note that in the fault trees in FIG. 11 and FIG. 12, although the description in the factor node indicating faults of the functional block itself is limited to "fault of "motor 1 output control section"" or the like for convenience of drawing preparation, the description may be more specific such as an "error of output value calculation processing of "motor 1 output control section."" Moreover, in the factor node indicating an error of an input signal, although only faults of a functional block that outputs an input signal such as "fault of "motor 1 output control section"" are described in parentheses for convenience of drawing preparation, faults in a communication channel may be additionally described.

The circular dependency detection section 33 detects a circulating dependency relationship (hereinafter, referred to as "circular dependency") in the dependency relationship search processing when generating a fault tree and ends a branch search when circular dependency is detected. When exclusion specification of the safety mechanism is omitted, circular dependency occurs in a feedback signal. This specification is therefore effective in a review of exclusion specification. In the present embodiment, the circular dependency detection section 33 is provided as an example of the determining section that determines whether or not there are, included in a plurality of functional blocks, a first functional block, a second functional block and a third functional block, with a signal line for propagating a signal to the third functional block being connected to the first functional block and a signal line for propagating a signal from the third functional block being connected to the second functional block.

Figure 13:
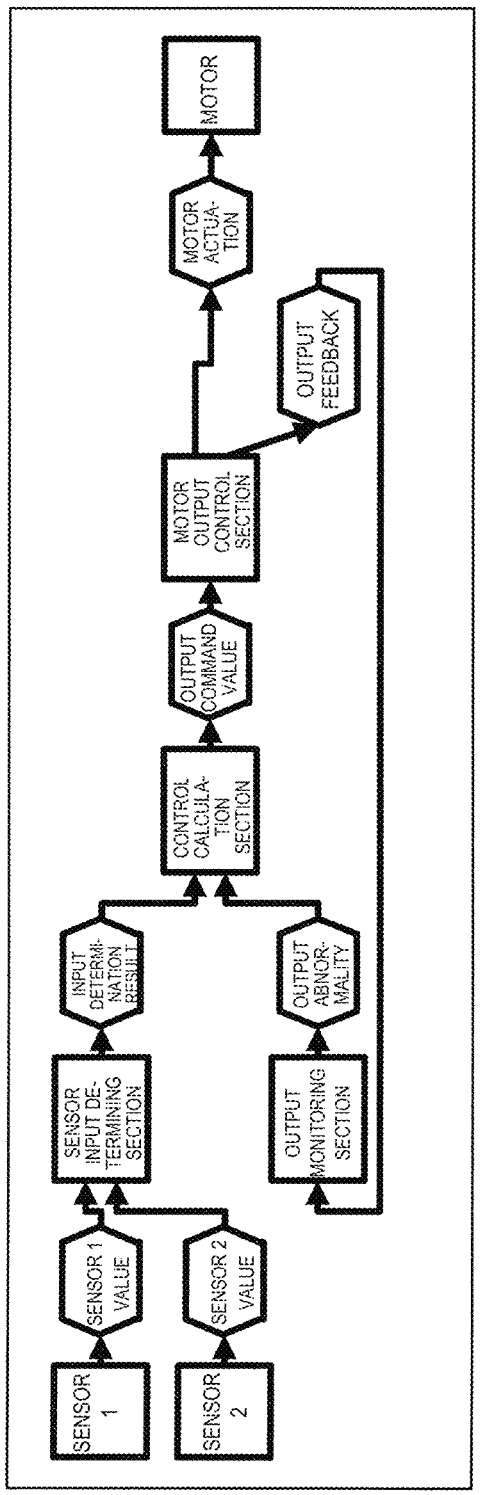
FIG. 13 illustrates an example of a functional block diagram displaying the occurrence of circular dependency according to the embodiment of the present invention.
Figure 14:
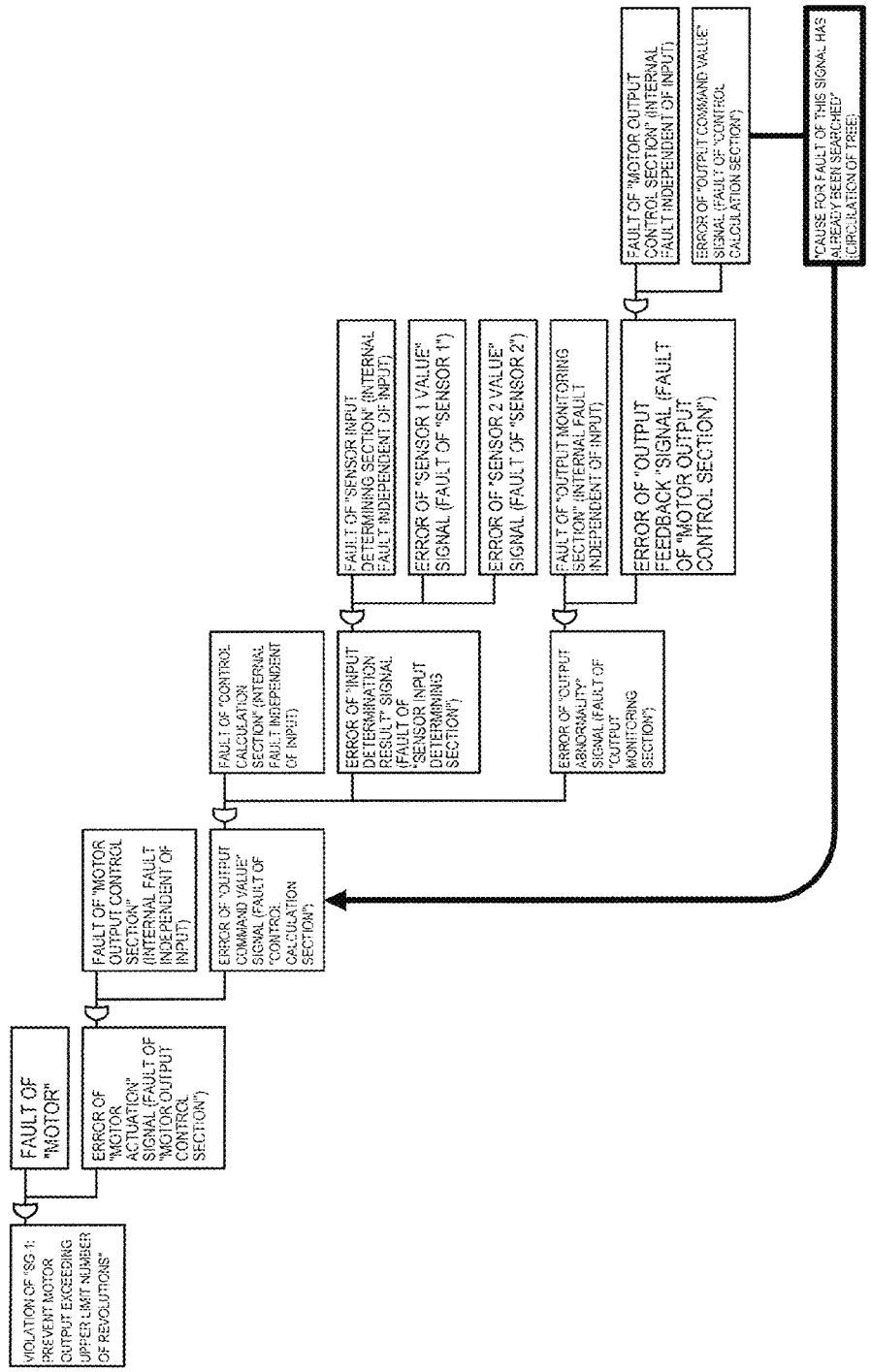
FIG. 14 illustrates an example of a fault tree displaying the occurrence of circular dependency according to the embodiment of the present invention.

FIG. 13 shows an example of a functional block diagram where circular dependency through feedback signal monitoring occurs. In this functional block diagram, such circulation occurs that an "output feedback" signal from the "motor output control section" is inputted to the "output monitoring section," the "output monitoring section" notifies the "control calculation section" of an "output abnormality" signal, and the "control calculation section" notifies the "motor output control section" of an "output command value" signal. In this case, the "motor output control section" is an example of the above-described first functional block, the "control calculation section" is an example of the second functional block and the "output monitoring section" is an example of the above-described third functional block. Furthermore, FIG. 14 shows an example of a fault tree generated from this functional block diagram and displaying the occurrence of circulation. In this fault tree, a solid-framed box indicating the occurrence of circulation is displayed at a position where the circulation occurs, and an arrow indicating a factor node from which the circulation starts (base point at which the same factor node is repeated) is also displayed.

Figure 15:
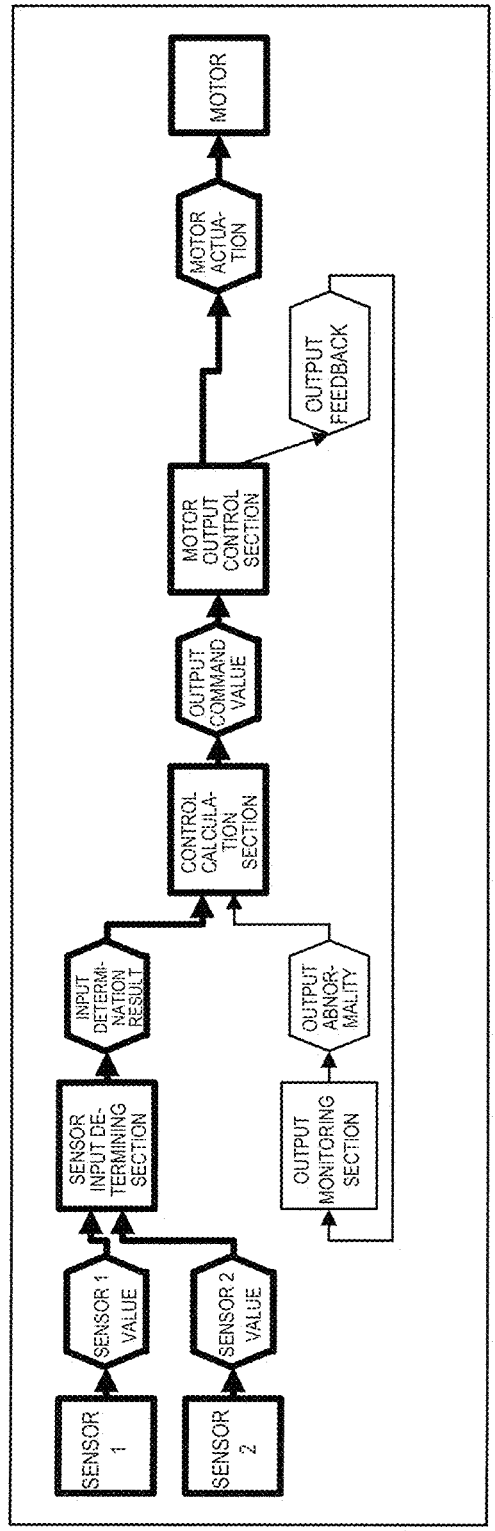
FIG. 15 illustrates an example of a functional block diagram reflecting a detection result within a search range when a functional block in which circular dependency occurs is specified to be excluded according to the embodiment of the present invention.
Figure 16:
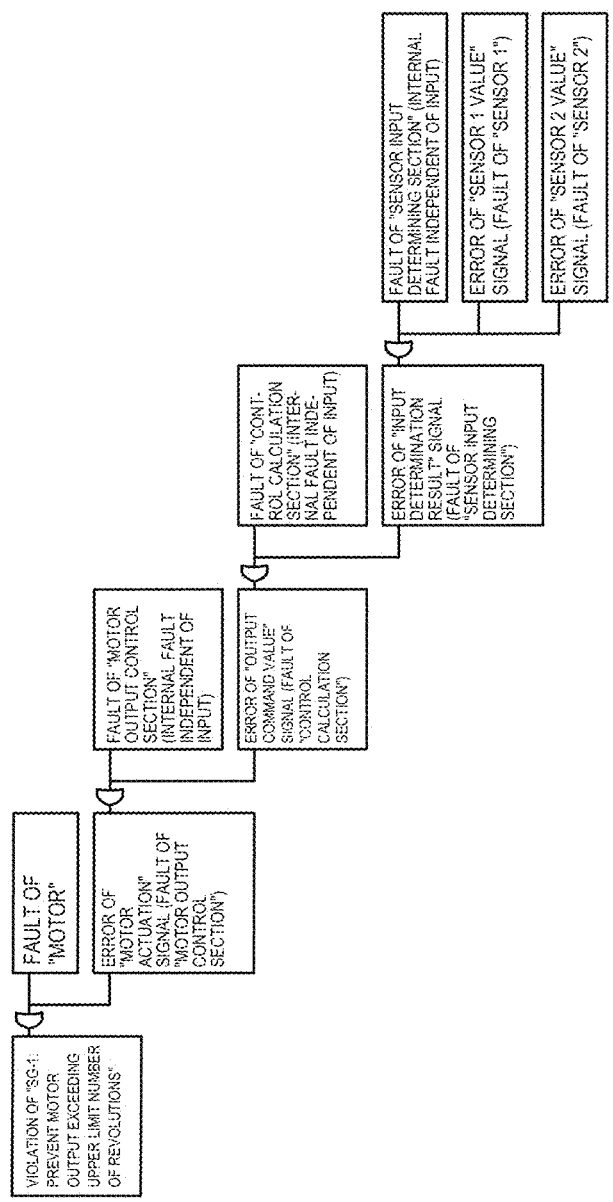
FIG. 16 illustrates an example of a fault tree generated when a functional block in which circular dependency occurs is specified to be excluded according to the embodiment of the present invention.

On the other hand, FIG. 15 shows an example of the functional block diagram displaying a search range when the exclusion functional block identification section 26 specifies the "output monitoring section" to be excluded as a safety mechanism. Furthermore, FIG. 16 shows an example of a fault tree generated within this search range. Since the part where circular dependency has occurred due to the safety mechanism is removed, this fault tree is appropriate for performing an initial FTA analysis.

In the fault trees in FIG. 14 and FIG. 16, although the description in the factor node indicating the fault of the functional block itself is limited to "fault of "motor output control section"" or the like for convenience of drawing preparation, the description may be more specific such as "error of output value calculation processing of "motor output control section."" Moreover, in the factor node indicating an error of an input signal, although only faults of a functional block that outputs an input signal such as "fault of "motor output control section"" are described in parentheses for convenience of drawing preparation, faults in a communication channel may be additionally described.

The user interface section 40 provides the above-described respective functional sections via the following user interface, and thereby efficiently assists with generation of an FTA fault tree. More specifically, as already described, the user interface section 40 provides the above-described respective functional sections via the functional block diagram, functional block-analysis panel, FTA execution panel and fault tree. Of these, the functional block diagram, functional block-analysis panel and FTA execution panel can be simultaneously displayed and operated with their arrangement adjusted.

First, the functional block diagram will be described. The functional block diagram includes functional blocks and lines indicating dependency relationships (signals) between the functional blocks, and thereby provides the following functions.

A first function is to call a functional block-analysis panel. That is, this is a function which becomes a premise for specifying exclusion of a dependency relationship or functional block or confirming the current excluded part. When a box indicating a functional block on the functional block diagram is selected by the keyboard/mouse 10*i* (see FIG. 1) or the like, this function displays a functional block-analysis panel corresponding to the functional block.

Another function is to select a search starting point functional block. That is, this is a function related to execution of the search starting point identification section 23. When a functional block (search starting point functional block) at the end on the output side which becomes an FTA search starting point (search starting point functional block) is selected by the keyboard/mouse 10*i* or the like, this function highlights the selected search starting point functional block. Alternatively, as alternate means, a function may also be adopted which displays a list of functional blocks at the end on the output side in a list box form in the FTA execution panel which will be described later and selects a search starting point functional block from this list.

A further function is to display a search range. That is, this is a function relating to the output part of a search range detected by the search-range detection section 31. When the "function of confirming a search range" or "function of generating a fault tree" is executed in an FTA execution panel which will be described later, this function excludes a range specified to be excluded from the search starting point functional block and highlights a functional block having a dependency relationship and lines of dependency relationships (signals).

Second, the functional block-analysis panel will be described. The functional block-analysis panel provides a functional block selected in the functional block diagram with a function of displaying a current situation of exclusion specification and a function of executing exclusion specification.

A first function is to specify a safety mechanism. That is, this is a function relating to execution of the exclusion functional block identification section 26. When the check box 422 is checked to indicate that the functional block itself is a safety mechanism, this function excludes this functional block from an FTA search in common to all FTA top events. In addition, reasons for exclusion as the safety mechanism and description can be entered in a text box 423.

Another function is to select an FTA top event. That is, this is a function relating to execution of the top event identification section 24. However, when a functional block-analysis panel is called with an FTA top event selected in an FTA execution panel which will be described later, the functional block-analysis panel is displayed with the top event selected. When there are more than one FTA top events, a top event specified to be excluded is selected from the list box 424. Alternatively, a combo box may also be used instead of the list box 424.

A further function is to specify exclusion of a functional block. That is, this is a function relating to execution of the exclusion functional block identification section 26. This function is constructed of a check box 425 for specifying, when performing a search for FTA on the FTA top event selected by the "function of selecting FTA top event," whether or not to exclude the functional block itself corresponding to this panel and a text box 426 for entering reasons for and description of exclusion.

A still further function is to specify exclusion of a dependency relationship. That is, this is a function relating to execution of the exclusion dependency relationship identification section 25. This function is constructed of the list box (multiple choice allowed) 427 for selecting an input signal whose search in the source is excluded from among input signals for a functional block corresponding to this panel when executing an FTA search corresponding to the FTA top event selected by the "FTA top event selecting function" and the text box 428 for entering reasons for and description of exclusion. Note that the interface for selecting an input signal may be substituted by a check box.

Using these functions, after specifying exclusion of the functional block as a safety mechanism or one that does not affect the FTA top event or after specifying exclusion of a dependency relationship, pressing the "OK" button confirms the exclusion specification and causes information on the exclusion specification to be stored in the exclusion information storage section 27.

Third, the FTA execution panel will be described. The FTA execution panel is a panel called from a menu bar or tool bar or the like. This panel is a mode-less panel in which operation of selecting a functional block in the functional block diagram or operation on the functional block-analysis panel is possible, even while the panel is being displayed, and provides the following functions.

A first function is to select an FTA top event. That is, this is a function relating to execution of the top event identification section 24. When there is more than one FTA top events, data relating to the corresponding exclusion specification is identified by selecting an FTA top event as an FTA search target from the list box 411. Alternatively, a combo box may also be used instead of the list box 411.

Another function is to confirm a search range. That is, this is a function relating to an output part of a search range detected by the search-range detection section 31. When the button 412 is pressed, this function displays an FTA search range on the functional block diagram with reference to exclusion specification of each functional block for an FTA top event selected by the "FTA top event selecting function." For example, this function displays the FTA search range with a thicker line than other parts. The present embodiment uses this thick line as an index to distinguish a part to be analyzed from a part to be excluded and provides this function of the user interface section 40 as an example of the adding section configured to add an index to the functional block diagram.

A further function is to generate a fault tree. This function relates to the output part of the fault tree generated by the fault-tree generation section 32. When the button 413 is pressed, this function draws a fault tree with reference to an exclusion specification of each functional block for an FTA top event selected by the "FTA top event selecting function." Here, the fault tree is assumed to be drawn and stored for each FTA top event.

Fourth, the fault tree will be described. A fault tree is drawn for each FTA top event as a result of executing the "fault tree generating function" on the FTA execution panel and provides the following functions.

A first function is to display a fault tree. That is, this is a function relating to the output part of the fault tree generated by the fault-tree generation section 32. This function displays a fault tree from which a functional block as a safety mechanism and functional blocks not affecting an FTA top event are excluded.

Another function is to display circular dependency. That is, this is a function relating to the output part of circular dependency detected by the circular dependency detection section 33. This function displays the occurrence of circulation on the fault tree when an already searched functional block is reached during an FTA search. In addition, this function displays the location where the circulation has occurred and a factor node which becomes a base point of a circulation pattern by connecting the two using an arrow.

Note that these functional sections are implemented through cooperation between software and hardware resources. More specifically, these functional sections are implemented by the CPU 10a reading a program for implementing the functional block diagram generation section 21, search starting point identification section 23, top event identification section 24, exclusion dependency relationship identification section 25, exclusion functional block identification section 26, search-range detection section 31, fault-tree generation section 32, circular dependency detection section 33 from, for example, the magnetic disk apparatus 10g into the main memory 10c and executing the program. Furthermore, the functional block diagram storage section 22 and exclusion information storage section 27 are implemented by, for example, the magnetic disk apparatus 10g.

Figure 17:
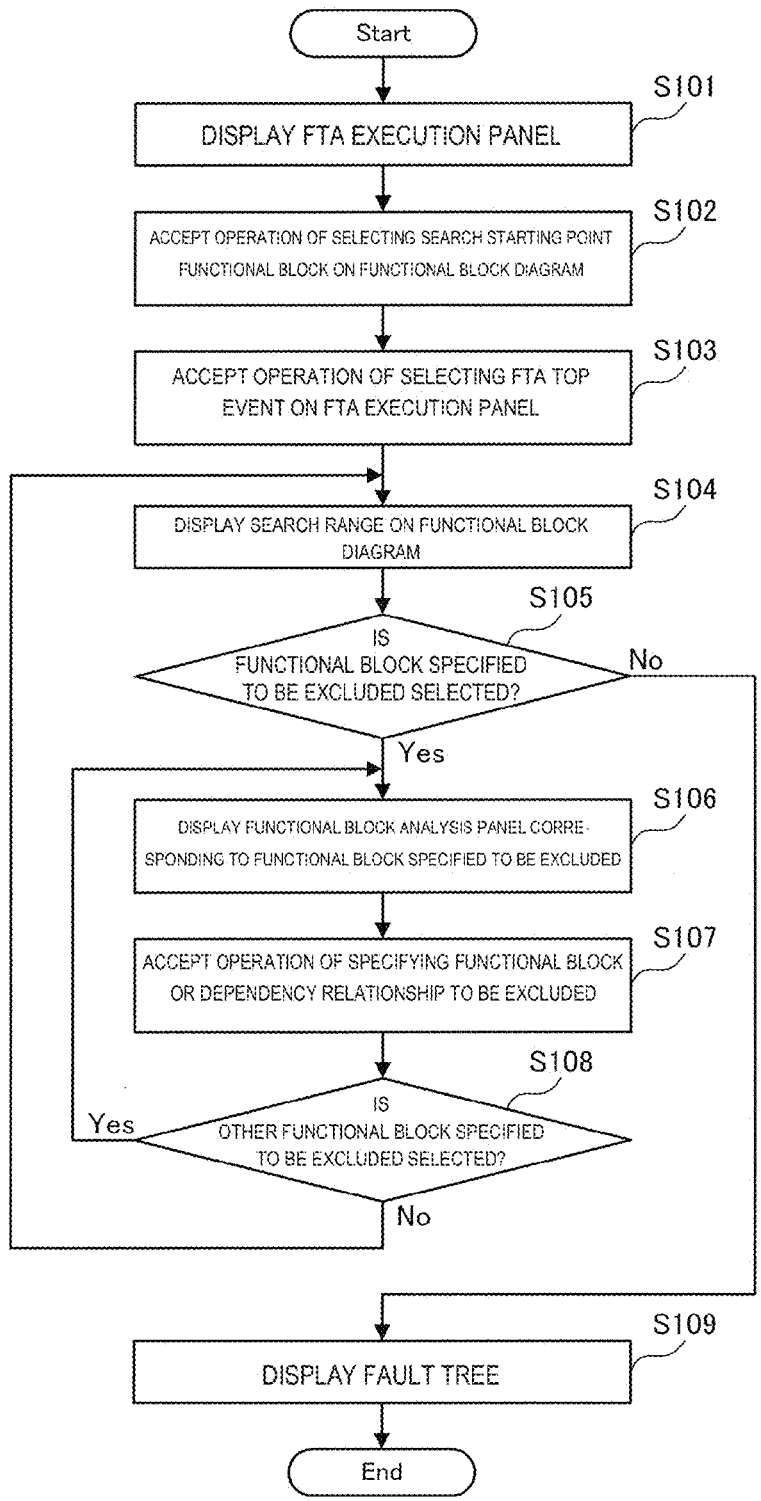
FIG. 17 is a flowchart illustrating an operational example of a user interface section of the safety analysis assistance apparatus according to the present embodiment.

FIG. 17 is a flowchart illustrating an operational example of the safety analysis assistance apparatus 10 according to the present embodiment. This operation is assumed to start with the user interface section 40 of the safety analysis assistance apparatus 10 displaying a functional block diagram on the display mechanism 10d (see FIG. 1).

When the user performs operation of calling an FTA execution panel from a menu bar or tool bar using the keyboard/mouse 10i (see FIG. 1), the user interface section 40 displays the FTA execution panel (step 101). Furthermore, when the user performs operation of selecting a search starting point functional block on the functional block diagram using the keyboard/mouse 10i or the like, the user interface section 40 accepts this operation (step 102). In this way, the search starting point identification section 23 identifies the search starting point functional block selected through this operation and stores information on the search starting point functional block in the exclusion information storage section 27. Furthermore, when the user performs operation of selecting an FTA top event specified to be excluded on the FTA execution panel using the keyboard/mouse 10i or the like, the user interface section 40 accepts this operation (step 103). Thus, the top event identification section 24 identifies the FTA top event selected through this operation and stores information on the FTA top event in the exclusion information storage section 27.

Next, when the user performs operation of pressing a button 412 (see FIG. 5) of the FTA execution panel using the keyboard/mouse 10i or the like, the user interface section 40 accepts this operation and displays an FTA search range on the functional block diagram (step 104). More specifically, when the user interface section 40 accepts this operation, the search-range detection section 31 detects the search range based on information on the search starting point functional block stored in the exclusion information storage section 27 and instructs the user interface section 40 to display this search range.

It is then determined whether or not the user interface section 40 has accepted the user's operation of selecting a functional block desired to be specified for exclusion on the functional block diagram using the keyboard/mouse 10i or the like (step 105).

Upon accepting the operation of selecting this functional block, the user interface section 40 displays a functional block-analysis panel corresponding to the functional block selected by this operation (step 106). When the user specifies the functional block to be excluded as the safety mechanism or one that does not affect the FTA top event or specifies a dependency relationship with respect to the functional block to be excluded on the functional block-analysis panel using the keyboard/mouse 10i or the like, the user interface section 40 accepts the specification (step 107). Thus, the exclusion functional block identification section 26 identifies the functional block to be excluded, the exclusion dependency relationship identification section 25 identifies the dependency relationship of the exclusion target and stores information on this functional block or dependency relationship in the exclusion information storage section 27 as the exclusion information.

After that, it is determined whether or not the user interface section 40 has accepted the user's operation of selecting another functional block on the functional block diagram using the keyboard/mouse 10*i* or the like (step 108). Upon accepting the operation of selecting another functional block, the user interface section 40 performs the processing in steps 106 and 107 on the functional block selected by this operation. In the case where the operation of selecting another functional block is not accepted within a certain period of time, the user interface section 40 applies exclusion specification to the functional blocks selected by the operations accepted so far, displays an FTA search range on the functional block diagram (step 104) and performs the processing in steps 105 to 108.

In the case where the operation of selecting another functional block has not been accepted within a certain period of time in step 105, if the user performs operation of pressing a button 413 (see FIG. 5) of the FTA execution panel using the keyboard/mouse 10*i* or the like, the user interface section 40 accepts this operation and displays a fault tree (step 109). More specifically, when the user interface section 40 accepts this operation, the fault-tree generation section 32 generates a fault tree from information on the functional block diagram stored in the functional block diagram storage section 22, and information on the search starting point functional block, information on the FTA top event, information on the functional block specified to be excluded and information on the dependency relationship specified to be excluded stored in the exclusion information storage section 27, and instructs the user interface section 40 to display this fault tree.

When the fault tree is created in this way, the user performs an FTA factor analysis using this fault tree. Upon determining that the search range needs to be changed, the user performs operation of selecting a functional block to be specified for exclusion on the functional block diagram using the keyboard/mouse 10*i* or the like. The user interface section 40 thereby performs the processing from step 106 onward. Upon determining that another analysis with a different FTA top event is necessary, the user performs operation of selecting a search starting point functional block on the functional block diagram using the keyboard/mouse 10*i* or the like. Thus, the user interface section 40 performs the processing from step 102 onward.

Figures 1, 18:
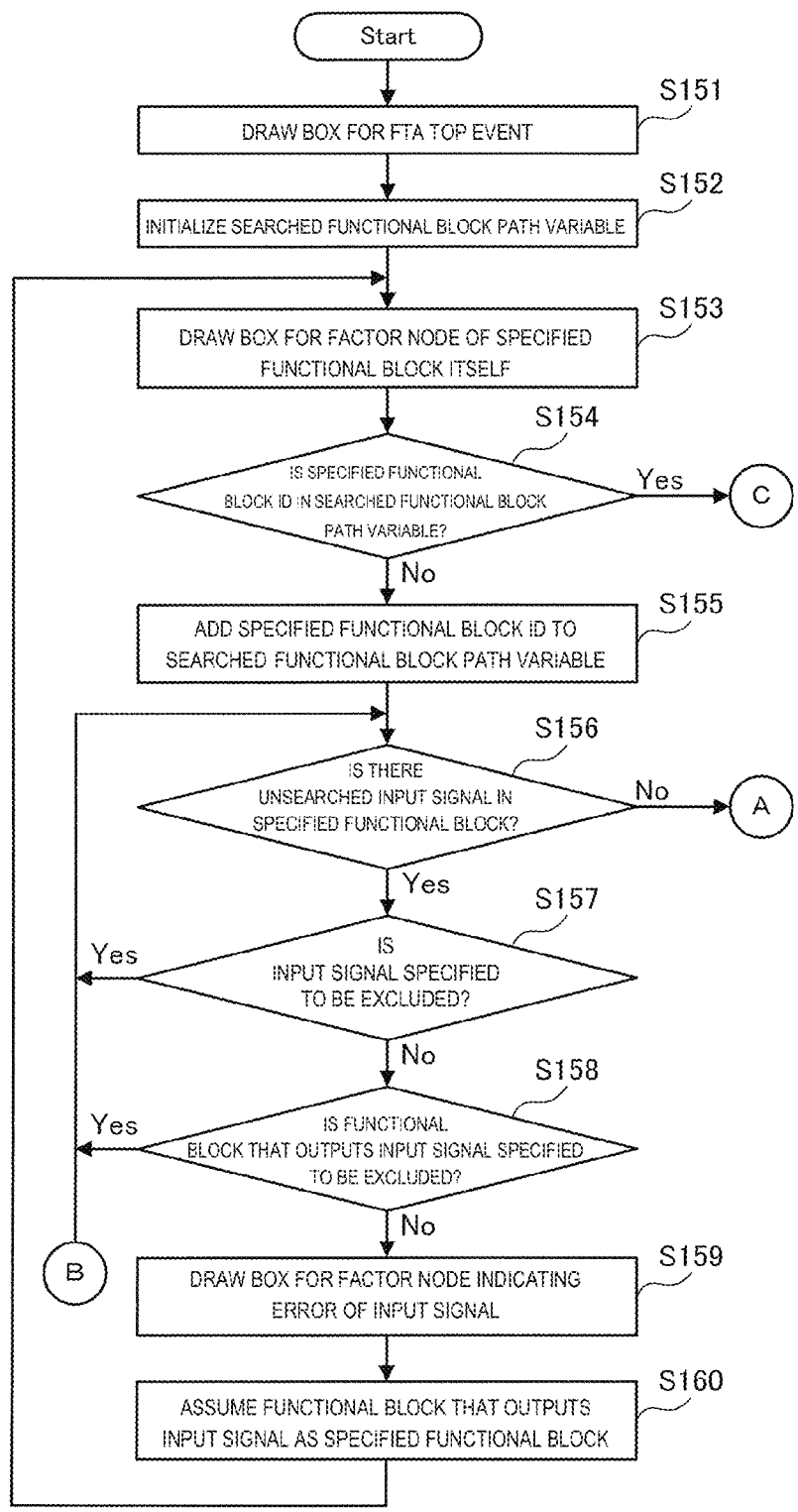
Figures 2, 18:
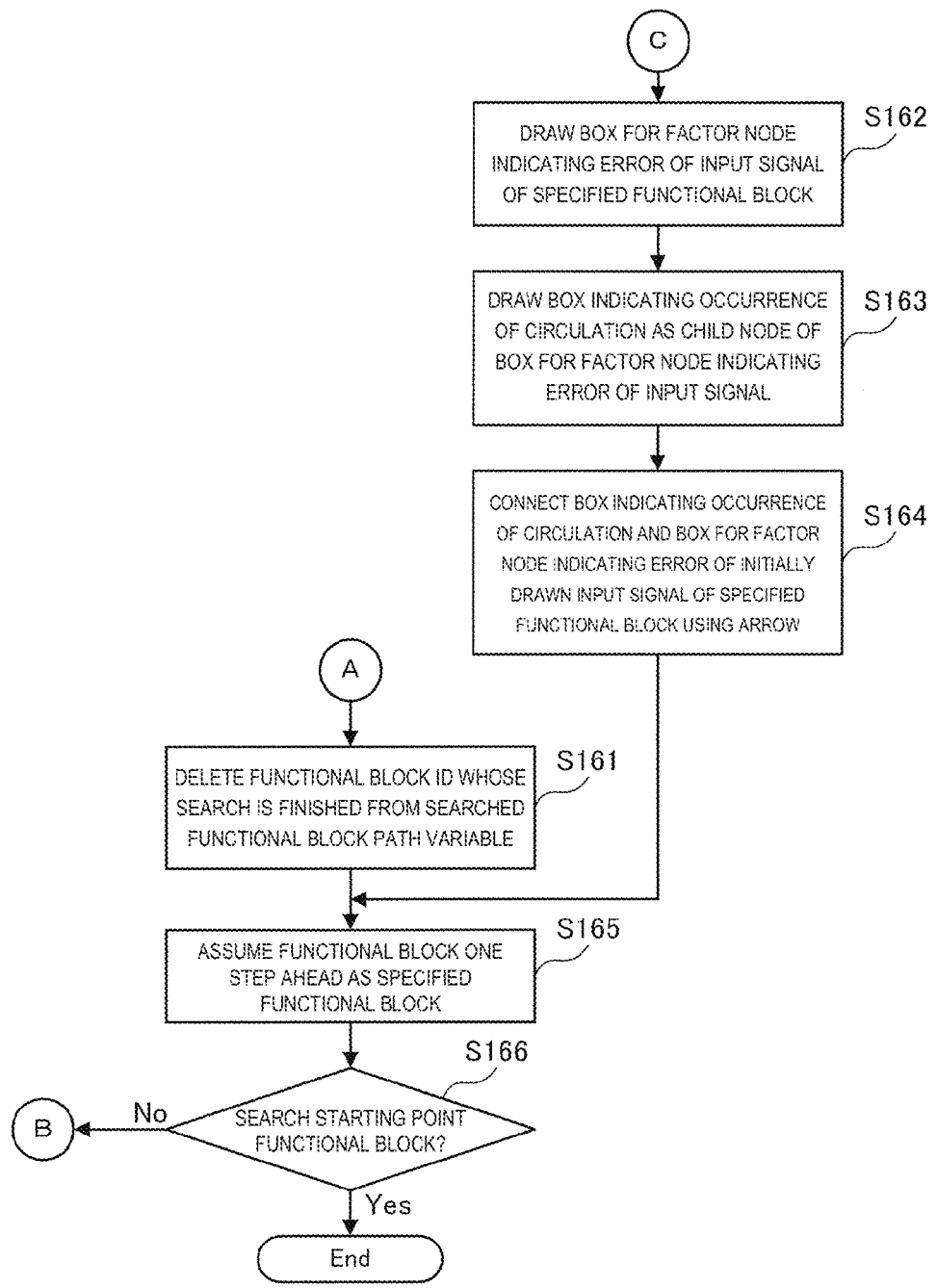

In step 109, the user interface section 40 displays the fault tree, and in that case, the fault-tree generation section 32 generates the fault tree as described above. FIG. 18-1 and FIG. 18-2 show a flowchart illustrating an operation example of the fault-tree generation section 32 in this case. Since the fault-tree generation section 32 is called from the user interface section 40 in step 109, the FTA top event and the search starting point functional block are assumed to have already been selected when the operation starts.

When the operation starts, as shown in FIG. 18-1, the fault-tree generation section 32 draws a box for an FTA top event, first (step 151). For example, in the fault tree of FIG. 12, a box with description "violation of "SG-1: motor 1 is stopped when stop switch is pressed"" is drawn. The fault-tree generation section 32 then initializes a searched functional block path variable (step 152). Here, the searched functional block path variable is a global variable or array and has a format such as {functional block #4, functional block #2, functional block #1} ("functional block #n" represents a functional block ID). With the searched functional block path variable, every time a recursive call of a functional block being searched is made, a functional block ID of the functional block is added, and the functional block ID of the functional block whose search has ended is deleted when returning to a functional block one step before the recursive call. Therefore, when a functional block being searched is found again within this searched functional block path variable, circular dependency (infinite loop processing) is assumed to have occurred. Thus, the circular dependency detection section 33 is assumed to store the searched functional block path variable and the circular dependency detection section 33 initializes the searched functional block path variable under the instruction of the fault-tree generation section 32.

Next, the fault-tree generation section 32 draws a box of a factor node corresponding to the specified functional block itself (step 153). Here, the "specified functional block" is a search starting point functional block identified by the search starting point identification section 23 in an initial state, and can be known from exclusion information stored in the exclusion information storage section 27. In states other than the initial state, the specified functional block is a functional block specified in step 160 which will be described later. For example, in the fault tree of FIG. 12, when the specified functional block is "motor 1," a box with description "fault of "motor 1,"" subordinate boxes with description "non-operation" and "non-stop" are drawn. On the other hand, when the specified block is "motor 1 output control section," a box with description "fault of "motor 1 output control section" (internal fault independent of input)" and subordinate boxes described "stop" and "runaway" are drawn.

Next, the fault-tree generation section 32 determines whether or not the functional block ID of the specified functional block is included in the searched functional block path variable (step 154). More specifically, the fault-tree generation section 32 hands the functional block ID over to the circular dependency detection section 33 and the circular dependency detection section 33 determines whether or not this functional block ID is included in the searched functional block path variable and returns the determination result to the fault-tree generation section 32.

As a result, when it is determined that the functional block ID of the specified functional block is not included in the searched functional block path variable, the fault-tree generation section 32 adds the functional block ID of the specified functional block to the searched functional block path variable (step 155). More specifically, the fault-tree generation section 32 hands the functional block ID over to the circular dependency detection section 33 and the circular dependency detection section 33 adds this functional block ID to the searched functional block path variable. The fault-tree generation section 32 then determines whether or not the specified functional block includes any unsearched input signal (step 156).

When it is determined that the specified functional block includes an unsearched input signal, the fault-tree generation section 32 determines whether or not the input signal is specified to be excluded (step 157).

When the input signal is specified to be excluded, the process returns to step 156, and the fault-tree generation section 32 performs the same processing on another unsearched input signal. For example, in the panel in FIG. 6, since a "switch OFF state" signal is specified to be excluded, processing relating to the "switch OFF state" signal is not performed. Moreover, when the input signal thereof is not specified to be excluded, the fault-tree generation section 32 determines whether or not the functional block that outputs the input signal is specified to be excluded (step 158).

When the functional block that outputs the input signal is specified to be excluded, the process returns to step 156, and the fault-tree generation section 32 performs the same processing on another unsearched input signal. For example, in the panel in FIG. 7, since the "sensor 2" is specified to be excluded, the processing relating to "sensor 2" is not performed. If the functional block that outputs the input signal is not specified to be excluded, the fault-tree generation section 32 draws a box for a factor node indicating an error of the input signal (step 159). For example, in the fault tree of FIG. 12, if the specified functional block is "motor 1," the box with description "error of "motor 1 operation" signal" (fault of "motor 1 output control section")" is drawn. On the other hand, if the specified block is "motor 1 output control section," a box with description "error of "input determination result" signal (fault of "sensor input determining section")" is drawn. The fault-tree generation section 32 assumes the functional block that outputs an input signal to be a new specified functional block (step 160), and repeats the processing from step 153 onward.

When it is determined in step 156 that the specified functional block does not include any unsearched input signal, as shown in FIG. 18-2, the fault-tree generation section 32 deletes the functional block ID of the functional block whose search has ended from the searched functional block path variable (step 161). More specifically, the fault-tree generation section 32 hands the functional block ID over to the circular dependency detection section 33 and the circular dependency detection section 33 deletes this functional block ID from the searched functional block path variable.

On the other hand, suppose it is determined in step 154 that the functional block ID of the specified functional block is included in the searched functional block path variable. More specifically, suppose that the circular dependency detection section 33 determines that this functional block ID is included in the searched functional block path variable and returns the determination result to the fault-tree generation section 32. In this case, as shown in FIG. 18-2, the fault-tree generation section 32 draws a box for a factor node indicating an error of an input signal for the specified functional block (step 162). For example, in the fault tree of FIG. 14, if the specified functional block is a "motor," a box with description "error of "motor operation" signal (fault of "motor output control section")" is drawn. On the other hand, if the specified block is a "motor output control section," a box with description "error of "output command value" signal (fault of "control calculation section")" is drawn.

Next, the fault-tree generation section 32 draws a box indicating the occurrence of circulation as a child node for the box of the factor node indicating an error of the input signal drawn in step 162 (step 163). For example, in the fault tree of FIG. 14, a box with description ""cause for fault of this signal has already been searched" (tree circulation)" is drawn as the child node for the box with description "error of "output command value" signal (fault of "control calculation section")." When the box is drawn as the child node, a box for the latter is normally drawn on the right side of the box for the former, but in FIG. 14, a box for the latter is drawn below the box for the former for convenience of drawing preparation.

Next, the fault-tree generation section 32 connects the box indicating the occurrence of circulation and the box of the factor node indicating an error of an input signal initially drawn for the specified functional block using an arrow (step 164). Here, the factor node indicating an error of the input signal initially drawn for the specified functional block is obtained by searching a dependency relationship table stored in the functional block diagram storage section 22 using the functional block ID of the specified functional block as a key. For example, in the fault tree of FIG. 14, the box with description ""cause for fault of this signal has already been searched" (tree circulation)" and the box on the leftmost side with description "error of "output command value" (fault of "control calculation section")" are connected via an arrow.

After the functional block ID is deleted from the searched functional block path variable in step 161 or after the two boxes are connected via an arrow in step 164, the fault-tree generation section 32 assumes the functional block one step ahead to be a new specified functional block (step 165).

After that, the fault-tree generation section 32 determines whether or not this specified functional block is a search starting point functional block (step 166). This determination may be made based on information on the search starting point functional block stored in the exclusion information storage section 27. When it is determined that this specified functional block is not a search starting point functional block, the process returns to step 156 and the fault-tree generation section 32 performs the same processing on another unsearched input signal. When it is determined that this specified functional block is a search starting point functional block, the fault-tree generation section 32 ends the processing.

In this operation example, circulation that occurs is drawn on a fault tree to thereby allow the user to specify the part to be excluded in which the circulation has occurred, for example, on the panel in FIG. 7, but the present invention is not limited to this. For example, in addition to drawing circulation that occurs on a fault tree, the user may be inquired whether or not to exclude the part in which the circulation has occurred and the part may be excluded if the user agrees to do so. Alternatively, the occurrence of circulation may be drawn on a fault tree and the part in which the circulation has occurred may be excluded without inquiring the user.

The fault tree generated in this operation example is handed from the fault-tree generation section 32 over to the user interface section 40 when the user interface section 40 displays the fault tree in step 109 of FIG. 17.

As described so far, in the present embodiment, the exclusion dependency relationship identification section 25 and the exclusion functional block identification section 26 identify a search range of a dependency relationship in units of functional blocks in a functional block diagram or inputs to the functional block. This prevents unnecessary factor nodes from being mixed into the fault tree generated by the fault-tree generation section 32.

In the present embodiment, a search range detected by the search-range detection section 31 when a fault tree is generated is displayed on a functional block diagram. This allows the user to visually confirm the search range and thereby to confirm appropriateness of narrowing down or perform further narrowing down.

Furthermore, in the present embodiment, it is possible to generate a fault tree while considering relevancy to an FTA top event from a concept-level functional block diagram with a low level of detail. It is thereby possible to efficiently realize an analysis narrowed down to a functional block related to an FTA top event while capitalizing on the comprehensiveness of mechanical generation of a fault tree.

Furthermore, in the present embodiment, when the circular dependency detection section 33 detects circular dependency between functional blocks, information indicating the occurrence of the circular dependency is displayed on the fault tree. When the circular dependency is attributable to insufficient narrowing down of the search range, the exclusion dependency relationship identification section 25 and the exclusion functional block identification section 26 narrow down the search range of the dependency relationship (exclusion of the part causing the circular dependency) and re-generate a fault tree. Even when circular dependency occurs in a concept-level functional block diagram with a low level of detail, this makes it possible to generate a fault tree with circular dependency excluded without changing the structure of the functional block diagram itself.

Furthermore, in the present embodiment, the exclusion dependency relationship identification section 25 and the exclusion functional block identification section 26 specify a search range for each FTA top event identified by the top event identification section 24. In this way, even when a search range is specified to exclude circular dependency, a fault tree already generated for another FTA top event is not affected. That is, it is not necessary to re-generate a fault tree which has already been generated for another FTA top event.

In the present embodiment, when narrowing down a search range of a dependency relationship, the exclusion dependency relationship identification section 25 and the exclusion functional block identification section 26 specify a functional block corresponding to the safety mechanism and input from the safety mechanism to be excluded, and the fault-tree generation section 32 generates a fault tree in this state. In this way, a fault tree not including any safety mechanism is generated. When designing a safety mechanism according to the ISO26262 standard, it is necessary to define what a normal function is and what a safety mechanism is, and this affects calculations of a fault rate or the like in subsequent processes. It is thereby possible to reliably and easily generate a fault tree excluding a safety mechanism as a starting point of a safety analysis.

In the present embodiment, when narrowing down a search range of a dependency relationship, the exclusion dependency relationship identification section 25 and the exclusion functional block identification section 26 store reasons for excluding a functional block and reasons for excluding an input. One-time review by a reviewer of the reasons for excluding the functional block and reasons for excluding the input is therefore sufficient. Further, the excluded parts do not appear as factor nodes on a fault tree, thus eliminating the necessity for confirming the same reasons for exclusion many times on the fault tree. As a result, the reviewer can efficiently review a fault tree analysis and confirm the search range or exclusion range of the fault tree on the functional block diagram, and can thereby visually determine comprehensiveness of the fault tree.

The description herein of embodiments of the present embodiment that generate a fault tree from a functional block diagram of an electronic device, should not be considered to limit the scope of this invention to such a device. The present invention is also, for example, applicable to embodiments that generate fault trees associated with other types of devices or processes, such as a software program or a computer network, so long as a dependency relationship between or among functional blocks subject to a fault review in a functional block diagram is known.

As described above, the present invention may be implemented entirely by hardware or entirely by software or may be implemented by both hardware and software. Furthermore, the present invention may be implemented as a computer, as a data processing system, or as a computer program. Such a computer program may be stored on and retrieved from a computer-readable storage device, such as an electronic, magnetic, optical, electromagnetic, solid-state, or semiconductor storage device, or a magnetic tape, removable computer diskette, random access memory (RAM), read-only memory (ROM), rigid magnetic disk, or optical disk.

Furthermore, the technical scope of the present invention is not limited to the above-described embodiment. It is obvious to those skilled in the art that various modifications can be made or alternate aspects can be adopted without departing from the spirit and scope of the present invention.

What is claimed is:

1. A method for generating a fault tree of an object to be analyzed, wherein the object to be analyzed comprises a plurality of functional blocks, the method comprising:
   a processor of a computer system storing a configuration information of the object to be analyzed, wherein the configuration information identifies the plurality of functional blocks and further identifies a plurality of signal lines that each connect two or more blocks of the plurality of functional blocks;
   the processor acquiring an exclusion target information that identifies a part to be excluded from the fault tree, wherein the part to be excluded comprises at least one of a first functional block of the plurality of functional blocks and a first signal line of the plurality of signal lines; and
   the processor creating from the configuration information and from the exclusion target information a fault tree of a part to be analyzed, wherein the creating comprises excluding the part to be excluded from the plurality of functional blocks and from the plurality of signal lines.

2. The method of claim 1, wherein the first functional block identifies a first operation and the first signal line identifies a propagation of a first signal between a pair of functional blocks of the plurality of functional blocks, and wherein a top-level event of the fault tree is dependent upon neither a performance of the first operation nor the propagation of the first signal.

3. The method of claim 2, further comprising:
   the processor further creating, as a function of the configuration information, a functional block diagram that graphically represents the plurality of functional blocks and the plurality of signal lines; and
   the processor, as a function of the exclusion target information, adding to the functional block diagram an index that distinguishes the part to be analyzed from the part to be excluded.

4. The method of claim 2, wherein the first operation is a logical operation.

5. The method of claim 1, wherein the part to be excluded is a safety block of the plurality of functional blocks, wherein the safety block identifies an operation associated with a safety mechanism.

6. The method of claim 5, further comprising:
   the processor further creating, as a function of the configuration information, a functional block diagram that graphically represents the plurality of functional blocks and the plurality of signal lines; and
   the processor, as a function of the exclusion target information, adding to the functional block diagram an index that distinguishes the part to be analyzed from the part to be excluded.

7. The method of claim 1,
   wherein the plurality of functional blocks comprises a first functional block, a second functional block, and a third functional block, wherein a signal line for propagating a signal to the third functional block is connected to the first functional block,
wherein a signal line for propagating a signal from the third functional block is connected to the second functional block,
wherein the part to be excluded comprises the third functional block, and
wherein the creating further comprises identifying a signal line for propagating a signal from the first functional block to the second functional block, if no such line already exists.

8. The method of claim 7, further comprising:
the processor further creating, as a function of the configuration information, a functional block diagram that graphically represents the plurality of functional blocks and the plurality of signal lines; and
the processor, as a function of the exclusion target information, adding to the functional block diagram an index that distinguishes the part to be analyzed from the part to be excluded.

9. The method of claim 1, further comprising:
the processor further creating, as a function of the configuration information, a functional block diagram that graphically represents the plurality of functional blocks and the plurality of signal lines; and
the processor, as a function of the exclusion target information, adding to the functional block diagram an index that distinguishes the part to be analyzed from the part to be excluded.

10. A computer program product, comprising a computer readable storage medium having a computer-readable program code stored therein, wherein the computer readable storage medium is not a transitory signal, said program code configured to be executed by a processor of a computer system to implement a method for generating a fault tree of an object to be analyzed, wherein the object to be analyzed comprises a plurality of functional blocks, the method comprising:
the processor storing a configuration information of the object to be analyzed, wherein the configuration information identifies the plurality of functional blocks and further identifies a plurality of signal lines that each connect two or more blocks of the plurality of functional blocks;
the processor acquiring an exclusion target information that identifies a part to be excluded from the fault tree, wherein the part to be excluded comprises at least one of a first functional block of the plurality of functional blocks and a first signal line of the plurality of signal lines; and
the processor creating from the configuration information and from the exclusion target information a fault tree of a part to be analyzed, wherein the creating comprises excluding the part to be excluded from the plurality of functional blocks and from the plurality of signal lines.

11. The computer program product of claim 10, wherein the first functional block identifies a first operation and the first signal line identifies a propagation of a first signal between a pair of functional blocks of the plurality of functional blocks, and wherein a top-level event of the fault tree is dependent upon neither a performance of the first operation nor the propagation of the first signal.

12. The computer program product of claim 11, wherein the first operation is a logical operation.

13. The computer program product of claim 10, wherein the part to be excluded is a safety block of the plurality of functional blocks, wherein the safety block identifies an operation associated with a safety mechanism.

14. The computer program product of claim 10,
wherein the plurality of functional blocks comprises a first functional block, a second functional block, and a third functional block,
wherein a signal line for propagating a signal to the third functional block is connected to the first functional block,
wherein a signal line for propagating a signal from the third functional block is connected to the second functional block,
wherein the part to be excluded comprises the third functional block, and
wherein the creating further comprises identifying a signal line for propagating a signal from the first functional block to the second functional block, if no such line already exists.

15. The computer program product of claim 10, further comprising:
the processor further creating, as a function of the configuration information, a functional block diagram that graphically represents the plurality of functional blocks and the plurality of signal lines; and
the processor, as a function of the exclusion target information, adding to the functional block diagram an index that distinguishes the part to be analyzed from the part to be excluded.

16. A computer system comprising a hardware processor, a memory coupled to said processor, and a computer-readable hardware storage device coupled to said processor, said storage device containing program code configured to be run by said processor via the memory to implement a method for generating a fault tree of an object to be analyzed, wherein the object to be analyzed comprises a plurality of functional blocks, the method comprising:
the processor storing a configuration information of the object to be analyzed, wherein the configuration information identifies the plurality of functional blocks and further identifies a plurality of signal lines that each connect two or more blocks of the plurality of functional blocks;
the processor acquiring an exclusion target information that identifies a part to be excluded from the fault tree, wherein the part to be excluded comprises at least one of a first functional block of the plurality of functional blocks and a first signal line of the plurality of signal lines; and
the processor creating from the configuration information and from the exclusion target information a fault tree of a part to be analyzed, wherein the creating comprises excluding the part to be excluded from the plurality of functional blocks and from the plurality of signal lines.

17. The computer system of claim 16, wherein the first functional block identifies a first operation and the first signal line identifies a propagation of a first signal between a pair of functional blocks of the plurality of functional blocks, and wherein a top-level event of the fault tree is dependent upon neither a performance of the first operation nor the propagation of the first signal.

18. The computer system of claim 16, wherein the part to be excluded is a safety block of the plurality of functional blocks, wherein the safety block identifies an operation associated with a safety mechanism.

19. The computer system of claim 16,
wherein the plurality of functional blocks comprises a first functional block, a second functional block, and a third functional block,
wherein a signal line for propagating a signal to the third functional block is connected to the first functional block,
wherein a signal line for propagating a signal from the third functional block is connected to the second functional block,
wherein the part to be excluded comprises the third functional block, and
wherein the creating further comprises identifying a signal line for propagating a signal from the first functional block to the second functional block, if no such line already exists.

20. The computer system of claim 16, further comprising:
the processor further creating, as a function of the configuration information, a functional block diagram that graphically represents the plurality of functional blocks and the plurality of signal lines; and
the processor, as a function of the exclusion target information, adding to the functional block diagram an index that distinguishes the part to be analyzed from the part to be excluded.

* * * * *